(12) United States Patent
Yeung et al.

(10) Patent No.: US 7,494,610 B2
(45) Date of Patent: Feb. 24, 2009

(54) METHODS FOR FABRICATING ZEOLITE MICROMEMBRANES

(75) Inventors: King Lun Yeung, Kowloon (HK); Koon Fung Lam, Yuen Long (HK); Samuel Heng, Villetaneuse (FR); Lik Hang Joseph Chau, Kowloon (HK)

(73) Assignee: The Hong Kong University of Science and Technology, Kowloon, Hong Kong (CN)

( * ) Notice: Subject to any disclaimer, the term of this patent is extended or adjusted under 35 U.S.C. 154(b) by 366 days.

(21) Appl. No.: 11/216,330

(22) Filed: Aug. 30, 2005

(65) Prior Publication Data

US 2007/0045174 A1    Mar. 1, 2007

(51) Int. Cl.
- *B29C 65/00* (2006.01)
- *B29C 47/92* (2006.01)
- *C01G 23/00* (2006.01)
- *B01J 29/04* (2006.01)

(52) U.S. Cl. ............................... 264/42; 264/48; 501/4; 501/33; 423/705; 55/223; 210/500.25; 502/85

(58) Field of Classification Search ............ 210/500.25, 210/500.23; 55/222–223; 502/4, 33, 38, 502/60, 64, 85; 95/902; 501/84, 85, 154, 501/13; 264/41, 42, 48; 427/556, 444; 423/705
See application file for complete search history.

(56) References Cited

U.S. PATENT DOCUMENTS

| | | | | |
|---|---|---|---|---|
| 5,100,596 A | * | 3/1992 | Haag et al. | 506/22 |
| 5,968,366 A | * | 10/1999 | Deckman et al. | 210/651 |
| 6,395,350 B1 | * | 5/2002 | Balkus et al. | 427/556 |
| 6,660,245 B1 | * | 12/2003 | Gaynor et al. | 423/705 |
| 6,960,327 B2 | * | 11/2005 | Navrotsky et al. | 423/130 |
| 7,018,948 B2 | * | 3/2006 | Parker et al. | 502/38 |
| 7,049,259 B1 | * | 5/2006 | Deckman et al. | 502/4 |

OTHER PUBLICATIONS

Joseph Lik Hang Chau et al, "Zeolite Microtunnels and Microchunnels," *Chem Commun.* 2002, pp. 960-961.

Yu Shan Susanna Wan et al, "TS-1 Zeolite Microengineered Reactors for 1-Pentene Epoxidation," *Chem Commun.* 2002, pp. 878-879.

Yu Shan Susanna Wan et al, "Design and Fabrication of Zeolite-Based Microreactors and Membrane Microseparators," *Microporous and Mesoporous Materials 42 (2001)*, Elsevier Science B.V., pp. 157-175.

O. Pachtová et al, "A Comparative Study of Template Removal From Silicalite-1 Crystals in Pyrolytic and Oxidizing Regimes," *Microporous and Mesoporous Materials 55 (2002)*, Elsevier Science B.V., pp. 285-296.

Joseph Lik Hang Chau et al, "Incorporating Zeolites in Microchemical Systems," *Chemical Engineering Journal 88 (2002)*, Elsevier Science B.V., pp. 187-200.

(Continued)

*Primary Examiner*—Ana M Fortuna
(74) *Attorney, Agent, or Firm*—Smith-Hill & Bedell, P.C.

(57) ABSTRACT

A method of activating a zeolite membrane comprising a step of placing the membrane in contact with a fluid mixture containing ozone, wherein when the fluid mixture is a gaseous mixture, the fluid mixture has a temperature of at least 423K, and wherein when the fluid mixture is a liquid mixture, the fluid mixture has a temperature of 353K.

18 Claims, 25 Drawing Sheets

1. Stainless steal tubular reactor
2. Zeolite membrane
3. Thermocouple
4. Pressure gauge A-Needle valve A to nitrogen pressure
5. Pressure gauge B-Needle valve B to ozone initial pressure
6. Bubble flowmeter
7. Ozone destructor
8. Gas exhaust
9. Temperature controller

OTHER PUBLICATIONS

Junhang Dong et al, "Template-Removal-Associated Microstructural Development of Porous-Ceramic-Supported MFI Zeolite Membranes," *Microporous and Mesoporous Materials 34 (2000)*, Elsevier Science B.V., pp. 241-253.

Imre Kiricsi et al, "The Advantages of Ozone Treatment in the Preparation of Tubular Silica Structures," *Applied Catalysis A: General 2003 (2000)*, Elsevier Science B.V., L1-L4.

Katherine H. Gilbert et al, "The Effect of Heating Rate and Gas Atmosphere on Template Decomposition in Silicalite-1," *Ind. Eng. Chem. Res. 2001, 40,* American Chemical Society, pp. 4844-4849.

\* cited by examiner

1. Stainless steal tubular reactor
2. Zeolite membrane
3. Thermocouple
4. Pressure gauge A-Needle valve A to nitrogen pressure
5. Pressure gauge B-Needle valve B to ozone initial pressure
6. Bubble flowmeter
7. Ozone destructor
8. Gas exhaust
9. Temperature controller

Figs. 16a-f

Table Gas separation result using the zeolite micromembrane

| Gas mixture | Permeance (mol s⁻¹ m⁻² Pa⁻¹ × 10⁻⁷) | Gas ratio (%) | | | H₂/CH₄ Sep. ratio |
| --- | --- | --- | --- | --- | --- |
| | | H₂ | CH₄ | CO₂ | |
| Feed | — | 61.7 | 12.3 | 26 | |
| Permeate | | | | | |
| Sil-1 | 9.64 | 52.0 | 15.5 | 32.5 | 0.65 |
| ZSM-5 Si/Al = 60 | 8.36 | 66.7 | 12.0 | 21.3 | 1.12 |
| ZSM-5 Si/Al = 40 | 4.26 | 71.4 | 9.5 | 19.1 | 1.5 |

Fig. 18

Etching conditions:

Etching temperature = 80°C

Etching time = 8 hours

Etching conditions:

25% TMAH

Etching time = 8 hours

Microneedle structures:

(a) Closed-tip microneedle  (b) Open-tip microneedle

METHODS FOR FABRICATING ZEOLITE MICROMEMBRANES

FIELD OF THE INVENTION

This invention relates to novel methods for fabricating zeolite and molecular sieve micromembranes, membrane-coated and membrane enclosed micro-cavities and microchannels, and to microstructures fabricated thereby.

BACKGROUND OF THE INVENTION

Zeolites are microporous crystalline aluminosilicate materials that have pore sizes ranging from about 0.3 nm to 1 nm. Because of their uniform, molecular-sized pores they can separate molecules based on their size, shape and polarity. They can therefore act as "molecular sieves" and are often described as such. Membranes made of zeolites and molecular sieves possess good thermal and chemical stability and thus have a number of practical applications, for example in the separation of gases and liquids and as selective barriers for sensors. In addition, zeolite materials have catalytic properties that means that they can be employed as catalysts in reactors such as packed-bed and membrane reactors.

The desirability of incorporating zeolite materials and structures in microsystem architectures has also been recognized. Chemical processes such as separation and reaction can benefit from miniaturization. Faster mass and heat transfer rates owing to the larger surface-to-volume ratios, and the well-defined flow and mixing patterns are some of the advantages of a microchemical system. Miniaturization also enables the design of smaller and more compact units, and allows for rapid design implementation due to the easier scale-up through replication.

PRIOR ART

Known techniques for forming zeolite microstructures in a number of forms such as zeolite microtunnels, microchannels and micromembrane structures are described in a number of prior art documents such as: "*Design and fabrication of zeolite-based microreactors and membrane microseparators*", Wan et al, *Microporous and Mesoporous Materials* 42 (2001) pp 157-175; "*TS-1 zeolite microengineered reactors for 1-pentene Epoxidation*", Wan et al, *Chem. Commun.*, 2002, pp 878-879; "*Zeolite microtunnels and microchannels*", Chau et al, *Chem. Commun.*, 2002, pp 960-961; and "*Incorporating zeolite in microchemical systems*", Chau et al, *Chemical Engineering Journal* 88 (2002) 187-200.

In such known prior techniques conventionally a substrate is patterned into localized areas formed with a tendency to encourage zeolite growth, eg by chemical modification and/or seeding with crystals that encourage zeolite growth. Photoresist techniques can be used to pattern these areas, and the remainder of the substrate may also be patterned so as to inhibit zeolite growth, again by using photoresist techniques. The surface of the substrate may also be chemically functionalized to encourage zeolite growth in a particular direction or orientation.

Zeolite may then be grown on the substrate preferentially in the patterned areas, and possibly in a preferred orientation, to form a two-dimensional structure. Three-dimensional structures may be formed in a number of ways, such as by progressively building on two-dimensional structures, or by subsequently using the porous property of the zeolite material to etch the substrate beneath the zeolite to form a microchannel covered by a zeolite membrane.

The use of photoresist techniques and chemical modification of the substrate surface facilitates the growth of patterned zeolite materials on the substrate. However, the organic materials used in the photoresist and for the chemical functionalisation of the substrate surface tend to become trapped in the pores of the zeolite as grown on the substrate. Such organic material must be removed before the zeolite material can function as a molecular sieve, porous membrane or the like, and the removal of the organic materials is known as "activation" of the zeolite.

A conventional activation technique is high-temperature air calcinations in which the trapped organic molecules are burned off during the calcinations process. For example, in "*A comparative study of template removal from silicate-1 crystals in pyrolytic and oxidizing regimes*", Pachtova et al, *Microporous and Mesoporous Materials*, 55 (2002) pp 285-296" reported the pyrolytic and oxidative removal of TPA+ from silicate-1 (Sil-1), but cracks are usually formed during the calcinations of zeolites. Cracks are found even in small, micron-sized Sil-1 and ZSM-5 crystal powders and the problem becomes even more severe in zeolite membranes. For example, in "*Template removal-associated microstructural development of porous-ceramic-supported MFI zeolite membranes*", Dong et al, *Microporous and Mesoporous Materials*, 34 (2000) pp 241-253 it was reported that the thermal stresses caused by the sudden shrinkage in zeolite crystals during template removal was the main contributing factor to crack formation in supported zeolite membranes. The presence of cracks in a membrane usually means poor membrane performance.

Ozone treatment has been employed for reactivation of zeolite catalyst powders (egg TS-1) after their use in reactions. For example, U.S. Pat. No. 5,681,789 discloses the removal of coke from the zeolite pores by ozone aided by the presence of active titanium atoms in the zeolite framework. Kiricsi et al ("*The advantages of ozone treatment in the preparation of tubular silica structures*", Kiricsi et al, *Appl. Catal. A.*, 203 (2000) L1-L4) demonstrated the use of ozone for low temperature template removal from microporous and mesoporous powders. Gilbert et al ("*The effect of heating rate and gas atmosphere on template decomposition in silicat-1*", Gilbert et al, *Ind. Eng. Chem. Res.* 40 (2001) pp 4844-4849) showed that the template removal from TPA-silicate-1 powders occurs under milder conditions in an air mixture containing ozone compared to other treatment gases such as air, oxygen and helium. All ozone studies to date, however, have been for zeolite catalyst powders where cracks do not affect their reaction performance and no information is provided in the prior art on the effect of ozone treatment on crack formation.

SUMMARY OF THE INVENTION

According to a first aspect of the present invention, there is provided a method of activating a zeolite membrane (or a zeolite film, a membrane-enclosed microstructure, a microneedle, a microsphere) comprising a step of placing the membrane in contact with a fluid mixture comprising ozone, wherein when the fluid mixture is a gaseous mixture, the fluid mixture has a temperature of at least 373K, and wherein when the fluid mixture is a liquid mixture (or a solution), the fluid mixture has a temperature of at least 298K. The activation of the membrane includes removal of templates from the membrane. These templates refer to ingredients used to produce the membrane. The template may include (i) a growth directing agent having molecules for directing the growth of the zeolite membrane or microstructure in its manufacture and (ii) a shape template which is a material used as a mold for growing the zeolite membrane or microstructure. The shape template may be polymer beads, photoresist, etc.

When the fluid mixture is the liquid mixture, the temperature may be required to be kept below the boiling point of water. One advantage of using the liquid mixture is that there is less aggregation or irreversible bonding of microspheres which is undesirable. Preferably, the fluid mixture may comprise a mixture of oxygen and ozone.

When the fluid mixture is the gaseous mixture the concentration of ozone in the mixture may preferably be at least 50 g/m$^3$. The ozone concentration of 50 g/m$^3$ has been found to be satisfactory in removing templates from the membrane. In particular, the temperature of the gaseous mixture may be at least 423K. More particular, the temperature may be about 473K. Further, the membrane may be placed in contact with the ozone containing gaseous mixture for at least 30 minutes. This treatment time is particularly suitable for activating a membrane which is a silicalite-1 membrane having a thickness of about 2 μm. When subjecting to the activation method, template to be removed from the membrane is gasified. Suitably, the method may comprise a step of oxidizing trapped template into gaseous product(s) and a further step of removing said products away from said membrane.

When the fluid mixture is the liquid mixture, the concentration of ozone passing through the mixture may be at least 50 g/m$^3$ but preferably about 100 g/m$^3$. The lower concentration has been found to be satisfactory in removing template from the membrane although the more optimal concentration is about 100 g/m$^3$. In particular, the temperature of the mixture may be 353K or less. Further, the membrane may be treated with the fluid mixture for at least an hour. The actual time required depends on a number of factors including the thickness of the membrane treated and the liquid in the fluid mixture. A treatment time of about 20 hours may be required. When subjecting to the activation method, the template to be removed from the membrane is partially gasified. Suitably, the activation method may comprise a step of free-radically oxidizing trapped template into soluble organic fragments and a further step of diffusing to and dissolving into the liquid mixture.

According to a second aspect of the present invention, there is provided a method of forming a zeolite membrane comprising the steps of (a) growing a zeolite membrane on a substrate, and (b) activating the membrane by an activation method as described above.

According to a third aspect of the present invention, there is provided a zeolite microstructure comprising a microsphere including a spherical member having a hollow interior defined by a zeolite membrane. An example of such a zeolite microstructure is shown by structure (7) in FIG. 24 and structure (5) in FIG. 25.

According to a fourth aspect of the present invention, there is provided a zeolite microstructure comprising an elongate structure in the form of a microneedle, wherein an elongate cavity is provided in the structure. The zeolite microstructure may be close-ended or open-ended.

BRIEF DESCRIPTION OF THE DRAWINGS

Some embodiments of the invention will now be described by way of example and with reference to the accompanying drawings, in which:

FIG. 18 relates to Example 8 and is a table summarizing the gas permanence of FIG. 17;

FIGS. 20(a) and (b) relate to Example 10 showing a fabricated zeolite membrane-enclosed microchannel, in which FIG. 20(a) is a schematic diagram and FIG. 20(b) is a SEM image;

FIGS. 22(a) and (b) relate to Example 11 in which FIG. 22(a) shows a close-tip microneedle and FIG. 22(b) shows a open-tip microneedle;

DETAILED DESCRIPTION OF PREFERRED EMBODIMENTS

Figure 1:
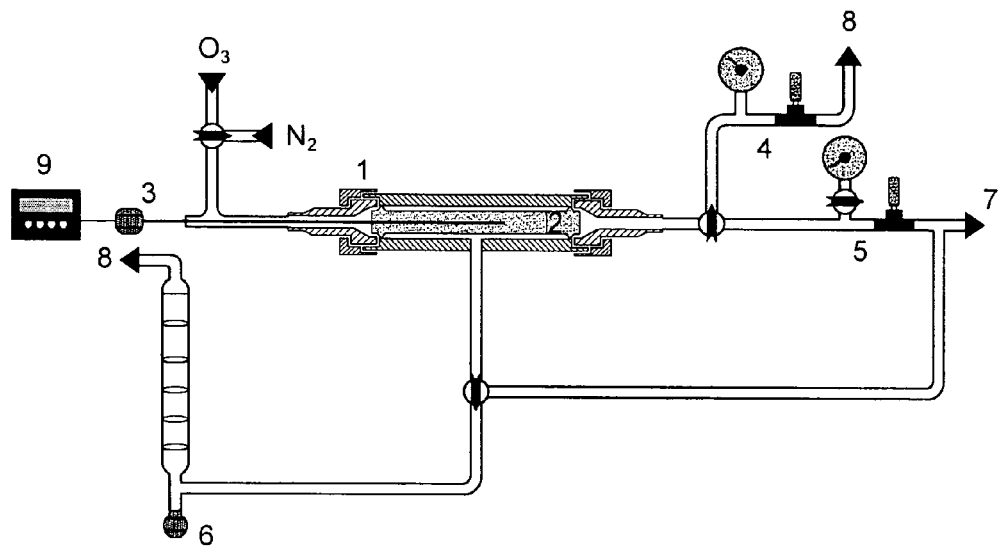
FIG. 1 illustrates an example of experimental apparatus used for performing zeolite membrane activation.

In the following examples a large number of zeolite membranes are formed using low-temperature ozone activation according to embodiments of the invention. The subsequent membranes are characterized and it can be seen that at least in preferred embodiments of the invention ozone activation provides a convenient and reliable method for membrane activation that ensures not only high gas permeability but also good reproducibility. In the examples given below high temperature calcinations is also illustrated for comparison purposes with low temperature ozone activation in gaseous phase or liquid phase.

Zeolite Membrane Synthesis and Characterization

Porous $\alpha$-$Al_2O_3$ tubes purchased from US Filters were chosen as the supporting substrate for the zeolite membranes. The tubes have a graded pore structure with the innermost supporting layer having a nominal pore size of 0.1 µm. The tubes were cut into 75 mm long pieces, rinsed with distilled, deionized water and dried in an oven overnight at 333K. The tubes were then calcined in a furnace at 823K for 8 hours to stabilize the tubes and to burn off adsorbed organic contaminants. The external surface of the ends of each tube were then sealed with a thin layer of an enamel glaze (obtained from Aremco Products) that could withstand temperatures of up to 873K, and the inner surface of each ceramic tube was then seeded with a layer of silicate-1 nanocrystals by slip-casting. The 100 nm silicate-1 seeds were prepared by hydrothermal synthesis and purified by a series of centrifugation and washing steps. The slip-casted tubes were then dried overnight in humid air to prevent rapid drying that can cause crack formation and delamination of the seed layer. The seeded tubes were finally calcined in air at 623K for 24 hours after further drying in an oven at 333K overnight.

While in the examples the seed layer is provided over the complete inner surface of the tube, the seeded areas could in principle have been patterned using photoresist techniques as described in the prior art, and chemical functionalisation (e.g. using SiOH groups) of the surface could be used either in place of or in addition to seeding in order to promote zeolite growth in selected areas.

The seeded tubes were then wrapped with a Teflon tape to prevent unwanted zeolite growth on the external surface of the tubes, and the tubes were then properly placed, preparation conditions were used as shown in Table I to produce three types of membranes: (A) 2 µm Sil-1 membrane, (B) 8-50 µm Sil-1 membrane, and (C) 2 µm ZSM-5 membrane. Detailed synthesis characteristics of these membrane types will be given below.

TABLE 1

| | Synthesis composition | T(K) | time (h) |
|---|---|---|---|
| (A) | 2 µm Sil-1 Membrane 40 TEOS: 10 TPAOH: 20,000 $H_2O$ | 403 | 18 |

TABLE 1-continued

| | Synthesis composition | T(K) | time (h) |
|---|---|---|---|
| (B) | 8-50 µm Sil-1 Membrane 80 TEOS: 10 TPAOH: 20,000 $H_2O$ | 453 | 24-200 |
| (C) | 2 µm ZSM-5 Membrane 40 TEOS: 4 $Al(OH)_3$: 1 TPAOH: 10 NaOH: 20,000 $H_2O$ | 423 | 24 |

In this Table, TEOS=tetraethyl orthosilicate (98%, Aldrich), TPAOH=tetrapropylammonium hydroxide (1M, Aldrich), NaOH=sodium hydroxide (99%, Riedel-de Haën).

The tubes were respectively placed in a Teflon vessel containing 100 ml of one of the synthesis solutions, and the Teflon vessel was sealed in a stainless steel autoclave and placed in a preheated oven. After synthesis, the autoclave was rapidly quenched to room temperature and the synthesized zeolite membrane was rinsed with DDI water and dried overnight in an oven at 333K. The membrane thickness and microstructure were then analyzed by scanning electron microscopy (SEM, JEOL 6300), while the membrane orientation and phase purity were examined by X-ray diffraction (XRD, Philips PWI 830). The elemental composition of the membrane was determined by X-ray photoelectron spectroscopy (XPS, Physical electronics PHI5600) and energy dispersive X-ray spectroscopy.

Gas permeability tests reveal, however, that the zeolite membranes as formed and prior to activation are impermeable to gases indicating an absence pores that is because $TPA^+$ templates are trapped in the pores. In the experiments to be discussed below the $TPA^+$ templates were removed using embodiments of the invention by a low temperature (eg at least 473K) ozone treatment, and for comparison purposes a conventional high temperature (823K) calcinations treatment, with both treatments being conducted using the experimental set-up shown in FIG. 1 which will be described below.

The tubular zeolite membranes 2 were placed (one at a time) in a stainless steel housing 1 sealed by O-rings and endcap assemblies. Rubber O-rings were used for low temperature ozone treatment, graphite O-rings were used for high temperature calcinations. Pure oxygen (for calcinations treatment examples) and oxygen-zone mixtures (for ozone treatment examples) are supplied through an inlet at a constant flow rate of 250 $cm^3$/min. The ozone (when used) was produced from a high purity (>99.7%, CWIG) by an electrical discharge ozone generator (Trailigas, Ozonconcept OZC1002) and the ozone concentrations entering and leaving the unit were monitored by an ozone gas analyzer (Trailigas, UVOZON TLG 200). The gas pressure was kept at 1.2 bar during the membrane treatment.

Nitrogen is also supplied and the permeate flux of the nitrogen across the membrane was measured at fixed time intervals during the activation process as a measure of the progress of template removal. A pressure difference of 0.8 barg was maintained and the nitrogen permeate flow was measured using a bubble flowmeter 6. The template removal as considered to be complete one a steady state nitrogen permeate flux was established. The membrane unit was heated by a high-temperature heating tape at a heating rate of 1 K/min and the treatment temperature was monitored by a thermocouple 3 and controlled by a temperature programmer unit 9. Valves 4 and 5 are respectively provided to monitor nitrogen pressure and ozone pressure, and gas is exhausted through 8 or through ozone destructor 7.

Figure 2:
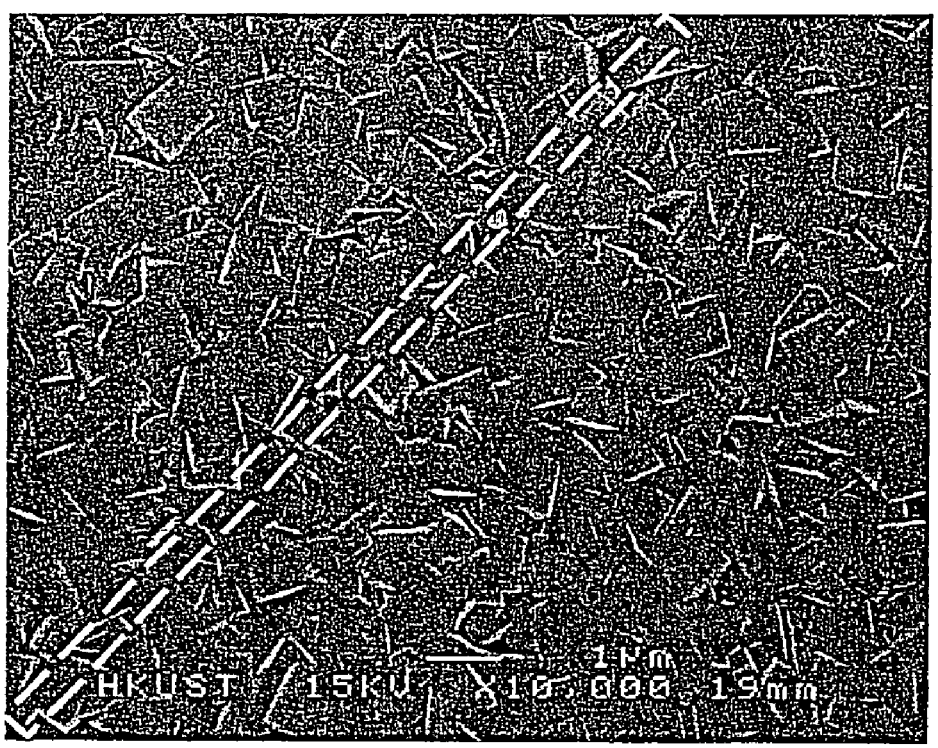
FIG. 2 is a scanning electron micrograph of a zeolite membrane activated using a calcinations technique according to the prior art.

Using the above techniques a large number of zeolite membranes were formed and activated by template removal using either low-temperature ozone treatment in accordance with embodiments of the present invention, or high temperature calcinations in accordance with prior art techniques. In these experiments three types of membranes were formed in accordance with the following synthesis parameters:

Type A:

Type A membranes are Sil-1 membranes formed with an average thickness of 2 μm grown over 18 hours at 403K from a synthesis solution comprising 40 TEOS: 10 TPAOH: 20,000 $H_2O$ (the numbers indicating the molar ratio). X-ray diffraction analysis indicated that the membranes were MFI (which is the name of a zeolite family) zeolite with a (101) preferred orientation. The polycrystalline membrane layer consists of interlocking zeolite crystals with an inverted pyramid shape exposing a flat, rectangular crystal facet on the surface (as shown in FIG. 2 which is an example of such a membrane).

Type B:

Type B membranes are thicker Sil-1 membranes formed with an average thickness of 25 μm from a synthesis solution of 80 TEOS: 10 TPAOH: 20,000 $H_2O$ after 48 hours at 453K. The Type B membranes displayed a strong diffraction peak corresponding to (101) orientation, however the intensities of the (002) and (200)/(020) peaks were higher than in the Type A membranes suggesting growth mismatch along the membrane thickness due to the faster zeolite deposition rate.

Type C:

Type C membranes are ZSM-5 membranes with a thickness of 2 μm grown from a synthesis solution of 40 TEOS: 4 $Al(OH)_3$: 1 TPAOH: 10 NaOH: 20,000 $H_2O$ for 24 hours at 423K. The resulting membranes also displayed a predominantly (101) orientation and had a Si/Al ratio of 13±3.

Prior Art

High temperature air calcinations is the most common method used for the removal of organic template molecules from zeolites. However, zeolite membranes and even single zeolite crystals prepared by a conventional prior art calcinations method may suffer from crack formation. FIG. 2 is a SEM picture of a conventionally activated zeolite membrane showing such a hairline crack. Cracks may be narrower than 20 nm and run across the membrane surface cutting across zeolite crystal grains. The crack may also penetrate through the thickness of the membrane. For example, the zeolite membrane may be silicalite-1 which is a pure silica-MFI zeolite where calcinations occurs in air at 55° C. at 0.5 to 1° C./min of heating rate.

Experimental Results

Figure 3A:
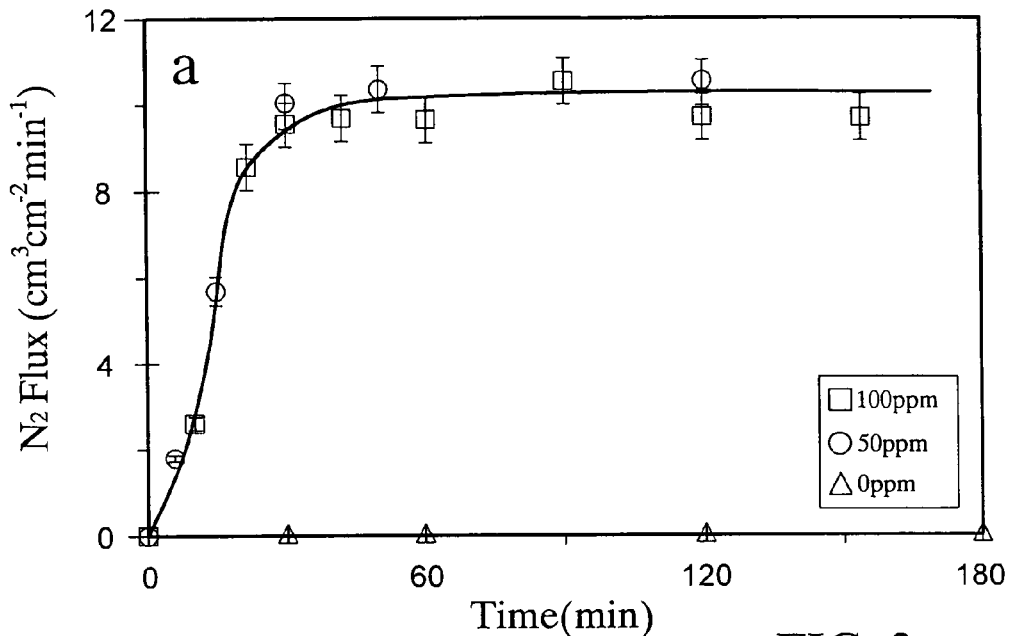
FIGS. 3(a) and (b) are plots of nitrogen flux against time for zeolite membranes being activated in accordance with embodiments of the present invention with (a) varying ozone concentrations and (b) varying temperatures.

FIG. 3(a) shows the effect of low temperature ozone treatment in gaseous phase in the activation of Type A zeolite membranes. An oxygen/ozone gas mixture was used at 473K with three different concentrations of ozone: 0 g/m³ (i.e. pure oxygen) (five membranes were used to obtain the data), 50 g/m³ (three membranes) and 100 g/m³ (ten membranes). The data shows that with no zone present, i.e. pure oxygen, the nitrogen permeability remains zero even after three hours of treatment. In contrast, with ozone present, a stable nitrogen permeability was reached after about 30 minutes. It can also be noted from FIG. 3(a) that there is no significant difference between the ozone concentrations of 50 g/m³ and 100 g/m³.

Figure 3B:
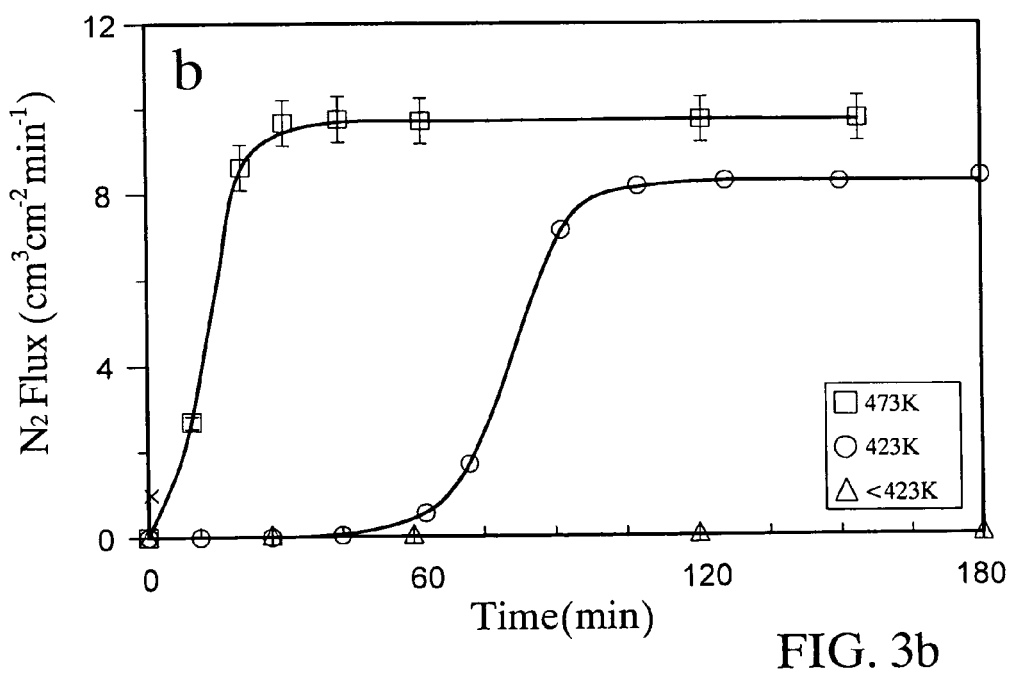

FIG. 3(b) shows the effect of varying the temperature on the effectiveness of the ozone treatment. Type A membranes were subject to an oxygen/ozone gas mixture (ozone concentration 10 g/m³) at temperatures of 298K, 323K, 343K, 373K, 423K and 473K. Ten membranes were tested at 473K, two membranes at 423K, and one membrane at each of 298K, 323K, 343K and 373K. The results shown in FIG. 3(b) show that ozone activation appears to be ineffective at temperatures below 423K. At 423K activation is somewhat slower, with no nitrogen flow until nearly 60 minutes and taking over 90 minutes for the nitrogen permeability to stabilize, and even then the nitrogen permeability is slightly lower than at 473K (15% less) suggesting incomplete activation.

FIGS. 3(a) and (b) show the effectiveness of ozone treatment in the activation of the zeolite membranes provided that the temperature is at least about 423K. However, since ozone is known to decompose at temperatures above 373K it is unlikely that ozone itself is the main oxidizer, rather it is more likely to be a radical species such as $O_2^*$ or $O_3^*$ formed during thermal decomposition of the ozone.

Figure 4A:
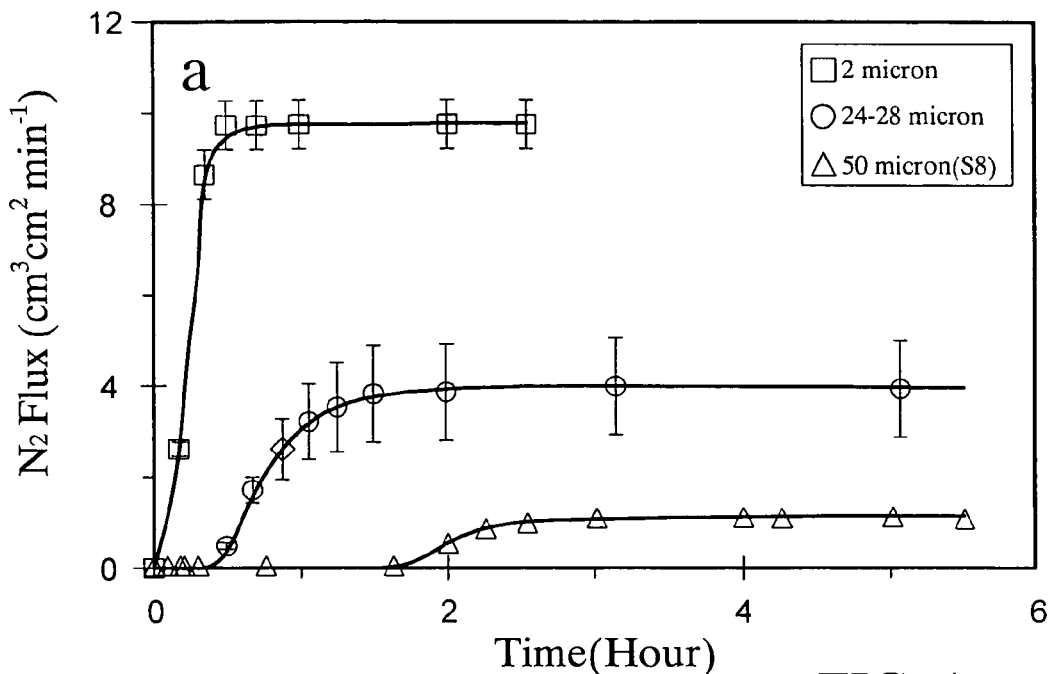
FIGS. 4(a) and (b) are plots of nitrogen flux against time for zeolite membranes being activated in accordance with embodiments of the present invention with (a) varying membrane thickness and (b) varying membrane aluminium content.
Figure 4B:
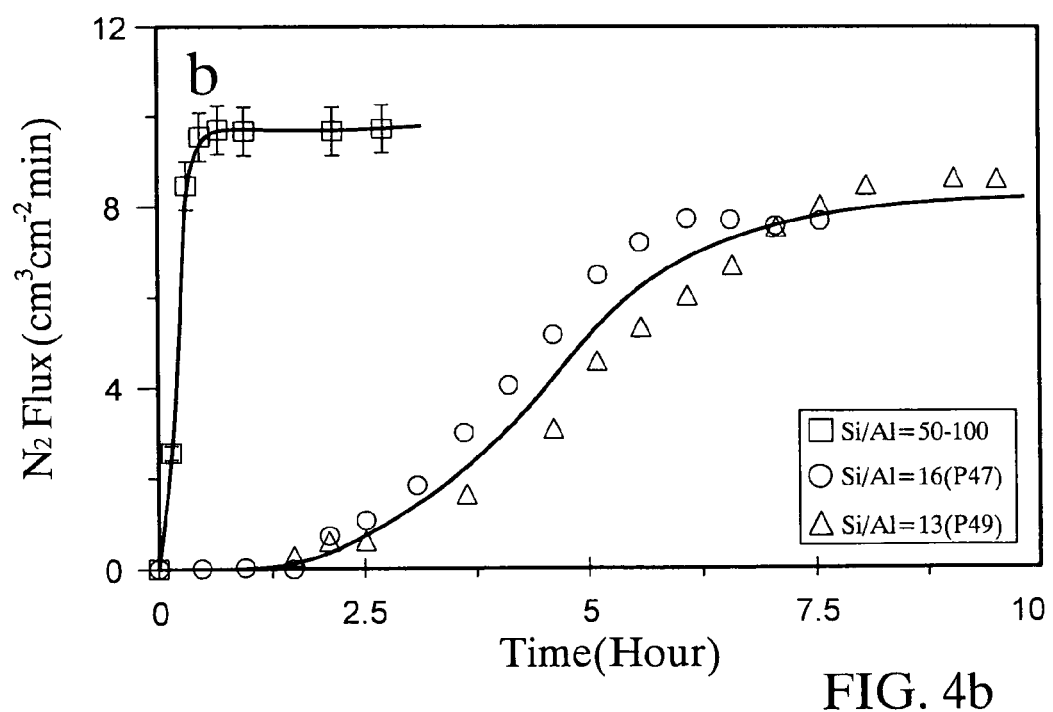

FIG. 4(a) illustrates the effect of different membrane thicknesses. FIG. 4(a) plots nitrogen flux as a function of time for membranes subject to ozone treatment at 473K and an ozone concentration of 100 g/m³. Ten Type A membranes were tested (results shown by the open squares), two Type B membranes were tested (results shown by open circles), and a single 50 μm micron membrane of Sil-1 zeolite membrane was tested (results shown by triangles). The results show that the 2 μm membranes can be activated in about 30 minutes, whereas the thicker 24 μm and 50 μm membranes require about 1.5 hours and 3 hours respectively, and even then their nitrogen permeability is significantly lower. Activation also takes substantially longer using ozone treatment with zeolite membranes having a relatively large aluminium content as can be seen from FIG. 4(b) where ozone treatment (100 g/m³ at 473K) was performed on membranes with different Si/Al ratios. It can be seen that it takes about 9.5 hours of ozone treatment to activate a Type C membrane with Si/Al ratio of about 14, compared with the 30 minutes of a Type A membrane with Si/Al greater than 50.

Figure 5A:
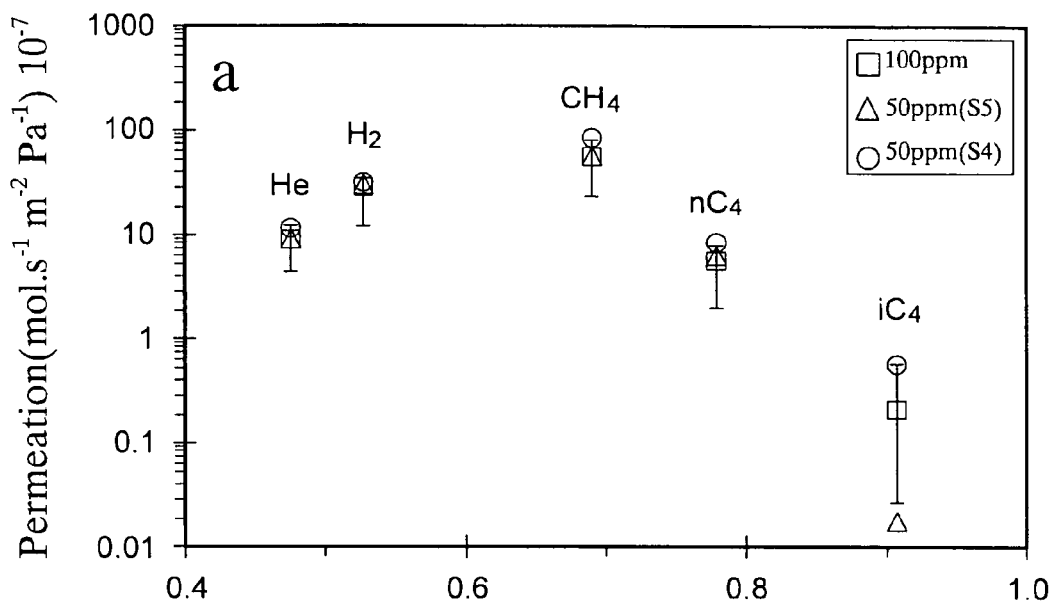
FIGS. 5(a) and (b) are plots of single gas permeance as a function of gas molecule size of membranes activated in accordance with embodiments of the invention with (a) varying ozone concentration and (b) varying activation temperature.

FIGS. 5(a) and (b) show the single gas permeance as a function of the ratio of the kinetic diameter of the gas molecule to the average zeolite pore size (i.e. 5.5 Å for MFI).

FIG. 5(a) shows the permeance of helium, hydrogen, methane, n-butane and isobutene for zeolite membranes treated with 50 g/m³ and 100 g/m³ at 473K. The permeance plot of FIG. 5(a) compares well with theoretical predictions. The smaller gas molecules (i.e. hydrogen and helium) display larger permeances than the bulkier hydrocarbons. The permselectivity of the zeolite membranes (Type A were used to obtain the data of FIG. 5(a)) is calculated from the ratio of single gas permeances and the Type A membranes exhibit an average hydrogen/helium=2.7±0.3, hydrogen/methane=0.5±0.1, hydrogen/n-butane=4.8±1.5 and hydrogen/isobutene=420±50. The calculated membrane permselctiveity of the butane isomers, ie n-butane/isobutene, is 90±40.

The literature shows the conventional thin zeolite membranes formed by prior art calcinations techniques display high permeance but low permselectivity. Good permselectivity is obtained in the prior art by increasing the membrane thickness, but this is at the cost of lower permeance. In contrast, however, thin zeolite membranes activated by an ozone treatment are capable of having both good permeance and good permselectivity.

Figure 5B:
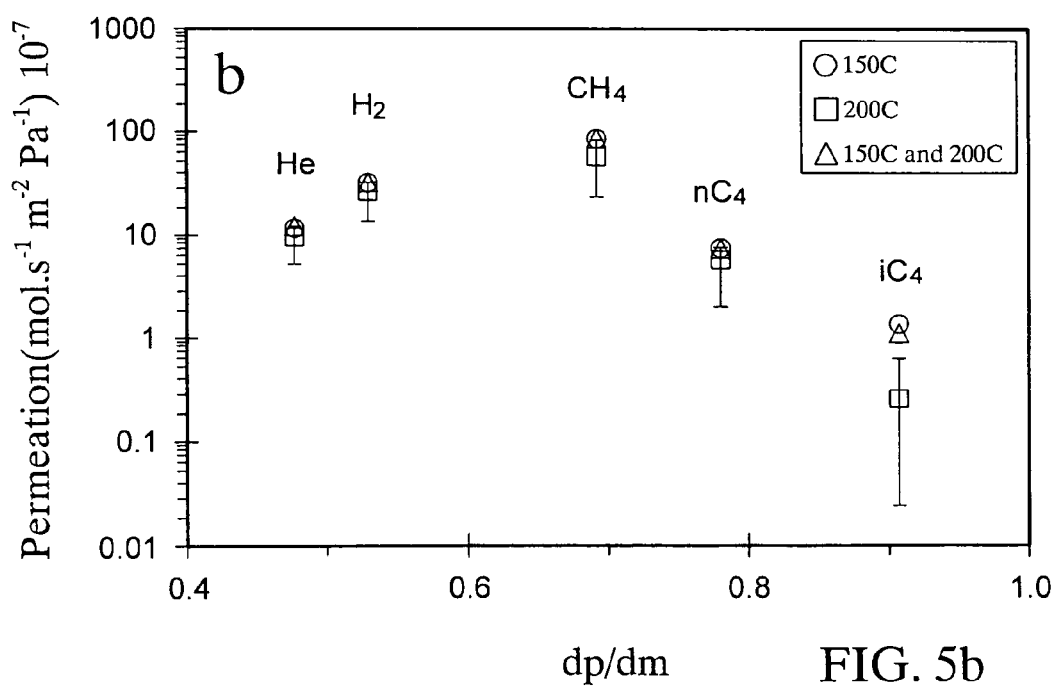

While FIG. 5(a) plots single gas permeance following activation using different ozone concentrations at 473K, for completeness FIG. 5(b) plots single gas permeance for membranes where the ozone concentration is fixed (100 g/m³) and the temperature is varied between 423K and 473K. It can be seen that membranes activated at 423 and 473K have similar single gas permeance results.

Figure 6A:
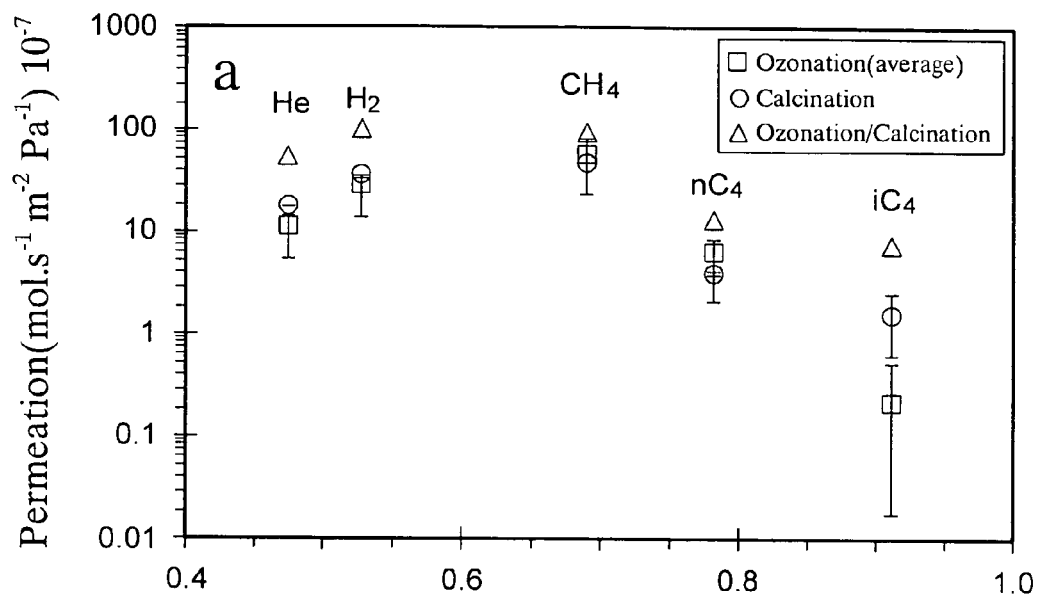
FIGS. 6(a) and (b) compares (a) the permeance and (b) selectivity of membranes activated in accordance with embodiments of the present invention and the prior art.
Figure 6B:
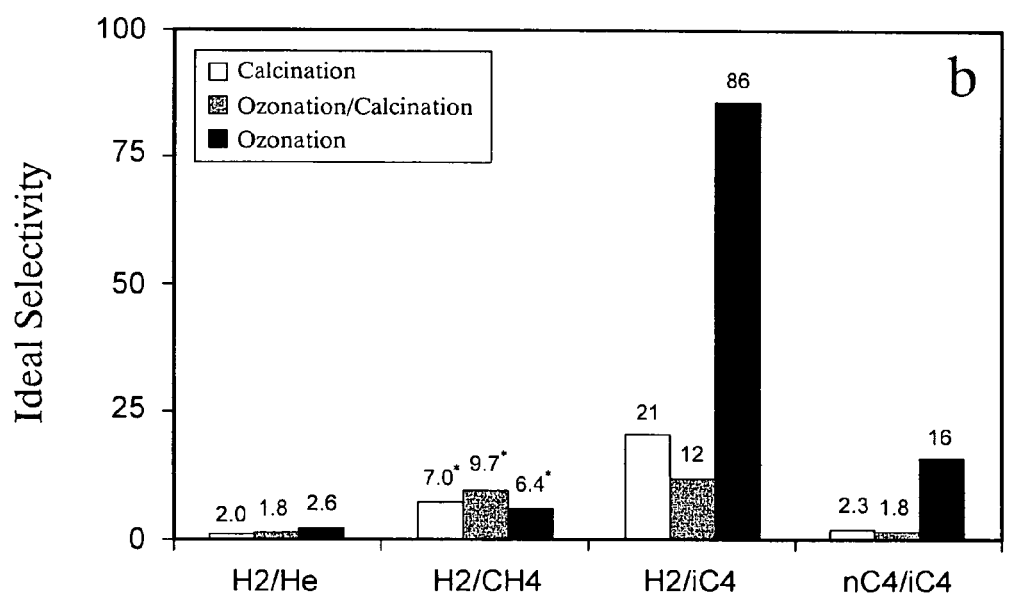

FIG. 6(a) plots the single gas permeance and FIG. 6(b) shows the permselectivity for membranes subject to ozone activation (100 g/m³, 473K) and prior art calcination ozone treatment followed by prior art calcinations. The results show no great difference in the single gas permeances except for large isobutene permeance (and decreased permselectivity) in the prior art caused by the presence of defects.

Figure 7A:
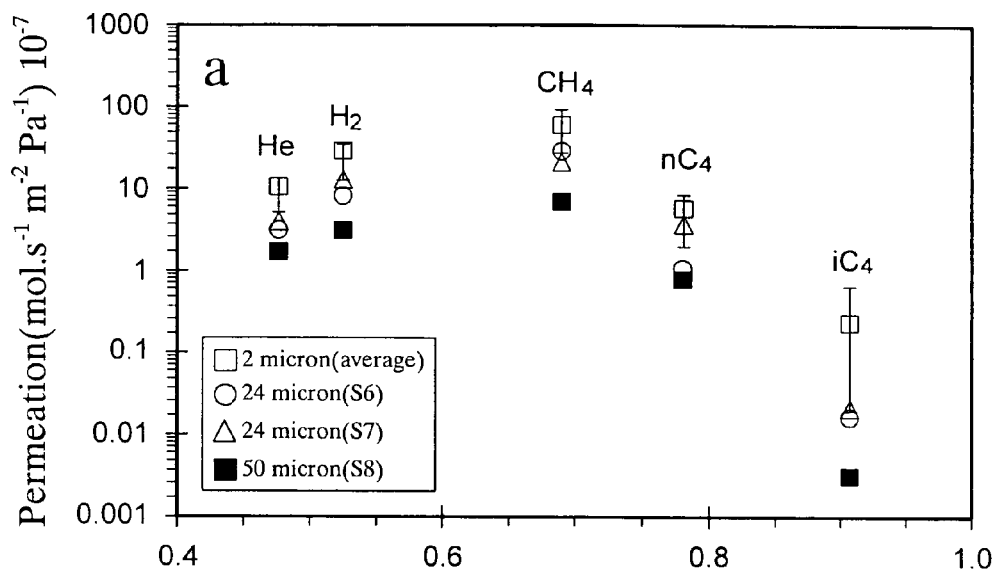
FIGS. 7(a) and (b) illustrates the permeance of membranes activated in accordance with the prior art with (a) varying membrane thickness and (b) varying aluminium content.
Figure 7B:
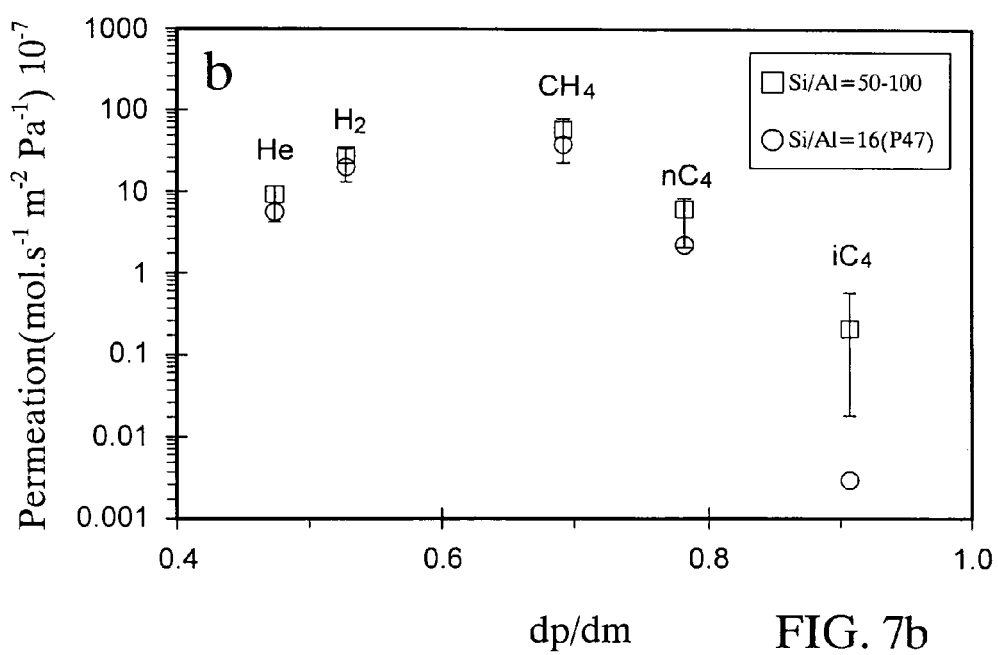

FIG. 7 illustrates the effect of membrane thickness and aluminium content (ie Si/Al ratio) on the single gas permeance. The membranes were formed by ozone treatment (473K, 100 g/m³). The gas permeances all decrease with increasing thickness (FIG. 7(a)), but the thicker membranes display better hydrogen/HC and butane isomens permselectivities. FIG. 7(b) compares the single gas permeances for membranes with Si/Al greater than and less than 50. The results are comparable except that the isobutance permeance is smaller for membranes containing more aluminium.

It is to be noted that while the above-described ozone treatment method is applicable in a gaseous phase, it is in fact also applicable in a liquid phase. The following twelve examples further illustrate the steps and conditions in detail involved in various aspects of the present invention and alternative methods in achieving zeolite membrane activation. In particular, Example 12 illustrates ozone activation of zeolite by treating the zeolite in liquid; Examples 1 to 2 demonstrate tile use of some of the alternative method instead of using ozone to activate the zeolite membrane; Example 3 demonstrates an ozone activation method in gaseous phase in accordance with an aspect of the invention; Examples 4 to 7 further disclose in detail the parameters that would affect the ozone treatment method for activating zeolite; and Examples 9 to 12 illustrate the different structures that could be made with the ozone treatment method.

EXAMPLES

Example 1

Zeolite Activation Using Calcination

One common method for zeolite activation is air calcination. In the process, the organic templates in the zeolite pores are burnt off by elevating to a relatively high temperature of more than 673K in furnace. However, one problem associated with high temperature calcination is formation of cracks on the zeolite membrane due to the difference of thermal expansion of the zeolite membrane and the substrate. The cracks formed in the membrane decrease the molecular sieving property of the zeolite membrane. FIG. 1 shows an example of crack formation on zeolite membrane during air calcination.

Experimental Procedure
(1) Preparation of porous α-alumina tubes purchased from US Filters (the tubes has a nominal pore size of 0.1 um) for growth of zeolite membrane:
  a. The α-alumina tubes were cut into 75 mm in length.
  b. The tubes were rinsed by DDI water and dried in a 333K oven for overnight.
  c. The tubes were calcined at 823K for 8 hours to stabilize the support and burn-off adsorbed organic contaminant if any.
  d. The pores at the ends of the tubes were sealed by coating a thin layer of enamel glaze (Aremco Products) which could withstand high temperature up to 873K.
(2) Seeding of the support (the prepared alumina tubes)
  a. 2.4 ml of 2 wt % ethanol-based zeolite nano-seeds with 100 nm diameter synthesized in Example 1a was applied to the inner surface of the tubes. The solution was kept in the tubes for 8 seconds.
  b. After that, another 2 ml of the seeding solution was applied to the tube by repeating the above procedures.
  c. The slip-casted tubes were dried overnight in humid air to prevent rapid drying which could cause crack formation of the seed layer.
  d. The tubes were then dried in 333K oven for overnight.
  e. The seeded tubes were calcined in air at 623K for 24 hours. The temperature changing rate was 2 (K/min).
(3) Zeolite (Sil-1) growth on the seeded alumina tubes by the method described in Example 1b below.
(4) Air calcination of zeolite membrane on the alumina tubes
  a. The tubes were put in a crucible which can withstand high temperature treatment.
  b. The crucible was put into an air-purging furnace. The furnace was programmed to increase the temperature to 823K and kept it for ? hours. The rate of change of the temperature was 2 (K/min).
(5) Gas Permeation of zeolite membrane
  a. A permeation setup consisted of a gas delivery unit, temperature and pressure control system and a membrane test module in which zeolite membrane on the alumina support was placed. Eight different gases can be directed to the membrane module.
  b. The module temperature was monitored by a K-type thermocouple and the temperature was maintained at 373K by a heating tape (Briskheat®) and a temperature controller (RKS, REX-C100). Helium gas (~30 cm³/min) purged the system for 3 hours. This step was used to remove any moisture or other adsorbed gases from the zeolite membrane.
  c. The permeance of five gases, namely, helium (99.999%, CWIG), hydrogen (99.999%, CWIG), methane (99.7%, HKSCG), n-butane (99.9%, HKSCG) and isobutane (99.5%, HKSCG) were measured at 323K at a constant trans-membrane pressure gradient of 0.4 barg using a bubble flowmeter.
  d. The permeance of each gas was measured for five times to reduce the measurement errors. The permeation experiment was repeated for some of the membranes in order to test the reproducibility.

Example 1a

Preparation of Zeolite Seeds

Zeolite seeds were prepared by nucleation of zeolite nanocrystals from homogeneous synthesis solution to obtain uniform seed size. Concentrated synthesis solution, low temperature and short synthesis time were often selected to prevent the growth of large zeolite crystals. The seeds were recovered and washed by centrifugation. The seeds were either suspended in water or solvent (e.g. ethanol, isopropanol, acetone, toluene). X-ray diffraction analysis and electron microscopy were performed to determine the zeolite type, crystallinity, size and morphology. The detailed procedures were:
(1) Zeolite seed syntheses Silicalite-1 (Sil-1) Seeds
The Sil-1 seeds were used to crystallize and grow MFI-type zeolites.
  a. 60 ml of 1 M tetrapropylammonium hydroxide (TPAOH, Aldrich Chemicals) were placed in a Teflon container and stirred.
  b. 0.9 g of sodium hydroxide (NaOH, BDH, 99%) was slowly added to the TPAOH solution.
  c. The solution was heated to 80° C. in a water bath.

d. 15 g of fumed silica (Aldrich, 99.8%) was slowly added and dissolved into the solution with constant stirring.
e. The mixture was stirred for 24 h at ambient conditions to obtain a clear synthesis solution with a composition of 12.5$SiO_2$:3.125$TPA_2O$:1NaOH:138$H_2O$.
f. The Teflon container with the solution were placed in a stainless steel autoclave.
g. The autoclave was placed in a preheated oven at 125° C. for 8 h to obtain 100±20 min Sil-1 crystal seeds. Lower temperature and shorter synthesis time were used to prepare Sil-1 crystal seeds with diameters <100 nm.
h. The synthesis was quenched rapidly to prevent further crystal growth.

(2) Seed CHARACTERIZATION

X-Ray Diffraction (XRD)
a. The sample was carefully packed on an aluminum holder.
b. The holder was clamped on the X-Ray diffractometer (PANalytical, X'pert Pro).
c. The sample was exposed with X-Ray with wavelength of 1.54 Å generated from copper source. The sample clamp and the X-ray source was rotated at the angular speed of 0.0087 (rad/s).
d. The crystallinity of the prepared sample was examined using the XRD graph.

Transmission Electron Microscopy (TEM)
a. 50 mg of the powder sample was suspended in 1 ml of ethanol. The solution was stirred vigorously until homogeneous solution was obtained.
b. The TEM sample holder with carbon grid was immersed in the solution.
c. The sample holder was removed from the solution and it was dried in a 278K pre-heated oven for 10 minutes.
d. The sample holder was clipped on the sample loader of the transmission electron microscope (JEOL, JEM 2010).
e. Crystallinity of the prepared sample was determined using electron diffraction mode of the microscope.
f. Morphology and particle size of the prepared sample was examined.

Example 1b

Preparation of Zeolite Film

The zeolite films were grown on seeded alumina tubes from synthesis solution under hydrothermal conditions.

A. Silicalite-1 (Sil-1) Film Synthesis
a. A 100 ml synthesis solution with a composition of 8$SiO_2$:1$TPA_2O$:4000$H_2O$ were prepared from tetraethyl orthosilicate (TEOS, Aldrich, 98%), TPAOH (1 M, Aldrich Chemicals) and DDI water, it was kept stirring for 24 hours.
b. The outer surface of the seeded alumina tubes was wrapped by teflon tape to prevent unwanted zeolite growth.
c. The wrapped tubes was placed in a Teflon sample holder and positioned vertically in the Teflon container.
d. The container was slowly filled with the synthesis solution.
e. The Teflon container was assembled in an autoclave and placed in a preheated oven at 130° C. for 24 h to grow 2 μm Sil-1 layer.
f. The synthesis was rapidly quenched and the sample was thoroughly rinsed with DDI water.
g. The tubes were dried at 333K in an oven for overnight.

B. ZSM-5 Film
a. A synthesis solution with a composition of 80$SiO_2$:10$Na_2O$:1$TPA_2O$:8$Al_2O_3$:40000$H_2O$ were prepared from tetraethyl orthosilicate (TEOS, Aldrich, 98%), alumina precursor, NaOH (BDH, 99%) TPAOH (1 M, Aldrich Chemicals) and DDI water.
b. The alumina precursor was made by adding hydrated aluminum sulphate (Aldrich, 98%) to ammonium hydroxide (Aldrich, 28%) to give an $NH_3$:Al ratio of 3. The mixture was gently heated under constant stirring until all the aluminum salt dissolved. The mixture was then cooled to room temperature and the mixture was stirred for 2 hours. The precipitated aluminum precursor was recovered by filtration and washed with DDI water.
c. The outer surface of the seeded alumina tube was wrapped by Teflon tape and was placed in a Teflon sample holder and positioned vertically in the Teflon container.
d. The container was slowly filled with the synthesis solution.
e. The Teflon container was assembled in an autoclave and placed in a preheated oven at 150° C. for 48 h to grow 2 μm ZSM-5 layer.
f. The synthesis was rapidly quenched and the sample was thoroughly rinsed with DDI water.

(2) Zeolite Film Characterization

The deposited zeolite film was characterized by X-ray diffraction and scanning electron microscopy (SEM).

Scanning Electron Microscopy (SEM)
a. The sample was carefully cross-sectioned.
b. Two pieces of the sample were cleaned with DDI water and ethanol to remove dirt and contaminants.
c. The two samples were respectively mounted flat and standing on copper stubs using conducting adhesives and silver paste before sputter-coating (Denton, DESK II) 20 nm Au.
d. SEM (JEOL, JSM 6300) images of the sample provided information on the film morphology, crystal grain size and intergrowth.
e. The film cross-section was imaged from the standing sample to reveal the film thickness and growth.

Example 2

Oxygen Plasma as an Alternative Method for Zeolite Activation

Instead of air calcination, oxygen plasma has been used to activate zeolite membrane since oxygen plasma provides an oxidizing environment that organic template in zeolite pores can be oxidized.

Experimental Procedure
(1) Preparation of porous α-alumina tubes purchased from US Filters (the tubes has a nominal pore size of 0.1 um) for growth of zeolite membrane:
a. The α-alumina tubes were cut into 75 mm in length.
b. The tubes were rinsed by DDI water and dried in a 333K oven for overnight.
c. The tubes were calcined at 823K for 8 hours to stabilize the support and burn-off adsorbed organic contaminant, if any.
e. The pores at the ends of the tubes were sealed by coating a thin layer of enamel glaze (Aremco Products) which could withstand high temperature up to 873K.

Figure 8:
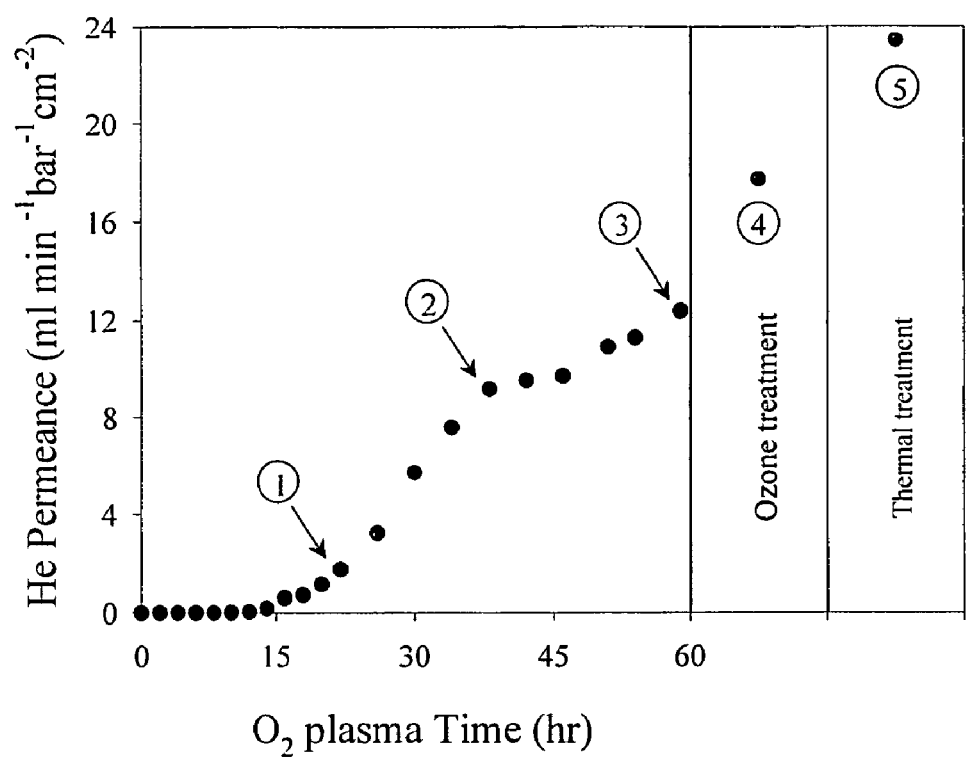
FIG. 8 relates to Example 2 and illustrates the relationship of duration of oxygen plasma treatment of a zeolite membrane and He permeance of the membrane.

(2) Seeding of the support (the prepared alumina tubes)
  a. 2.4 ml of 2 wt % ethanol-based zeolite nano-seeds with 100 nm diameter synthesized in Example 1a was applied to the inner surface of the tubes. The solution was kept in the tubes for 8 seconds.
  b. After that, another 2 ml of the seeding solution was applied to the tube by repeating the above procedures,
  c. The slip-casted tubes were dried overnight in humid air to prevent rapid drying which could cause crack formation of the seed layer,
  d. The tubes were then dried in 333K oven for overnight,
  f. The seeded tubes were calcined in air at 623K for 24 hours. The temperature changing rate was 2 (K/min).
(3) Zeolite (Sil-1) growth on the seeded alumina tubes is formed by using the method described in Example 1b.
(4) Oxygen plasma for zeolite activation
  a. The zeolite-coated substrate was placed in quartz holder and introduced to the oxygen plasma chamber in Branson/IPC4000 Photoresist Stripper.
  b. Temperature of the chamber was heated to 373K with temperature increasing rate of 10 (K/min).
  c. Oxygen (HSG, ultrahigh purity) was introduced at a flow rate of 500 ($cm^3$/min). The oxygen plasma was generated by 550 W radio frequency.
  d. The treatment duration lasted for 30 minutes. The plasma energy must be carefully adjusted to prevent etch damage on the sample.
  e. After that, the above procedure was repeated if more oxygen plasma treatment was required.
(5) Helium permeation for checking the extent of the zeolite membrane activation
  a. A permeation setup consisted of a gas delivery unit, temperature and pressure control system and a membrane test module in which zeolite membrane on the alumina support was placed. Eight different gases can be directed to the membrane module.
  b. The module temperature was monitored by a K-type thermocouple and the temperature was maintained by a heating tape (Briskheat®) and a temperature controller (RKS, REX-C 100).
  c. Before starting the permeation, the membrane was heated to 323K at 2 (K/min).
  d. The feed helium pressure was kept at 1.408 barg while the permeate pressure was always kept at ambient pressure and no sweep gas was used.
  e. The flow rate of permeate was measured using a bubble flowmeter (home-made) under ambient conditions (i.e. 1 bar, 298 K). The permeance was measured for five times to reduce the measurement errors.
The He permeance characteristics of the zeolite membrane are shown in FIG. 8.

Example 3

Removal of Trapped Organic Growth Directing Molecules from Zeolites and Molecular Sieves In this example, low-temperature ozone treatment was demonstrated to be an effective method to activate zeolite membrane oxidizing the organic templates in the zeolite pores via the reacting ozone molecules. Free-standing zeolite membrane was synthesized for the study of ozone treatment.

Experimental Procedure
(1) Preparation of silicon wafer
  a. Silicon wafer (e.g. <100>, <101>, <110> and polycrystalline Si) was used as substrate. The wafer was pre-cleaned by sulphuric acid at 130° C. for 10 minutes and rinsed with distilled, deionized (DDI) water.
  b. The native oxide was removed by hydrofluoric acid at room temperature for 1 minute.
  c. The wafer was dried using compressed air.
  d. After rinsing and drying, 1-10 µm layer silicon nitride was deposited on the wafer by chemical vapor deposition using Thermco TMX 9001 LPCVD.
(2) Transfer of micropatterns by Photolithography to both front and backside of the wafer
  a. HMDS priming for 10 minutes.
  b. Spin-coating of 2 µm layer photoresist (HPR207) on the wafer at 4000 rpm for 30 seconds using Solitec 5110-C/PD Wafer Spinner.
  c. The photoresist was soft-baked at 110° C. for 1 minute on a pre-heated heat plate.
  d. The pattern mask was aligned on the wafer and exposed to UV light for 17 seconds using AB-Manufacturing Contact Aligner.
  e. The photoresist was developed using FHD-5 for 2.5 minutes.
  f. The sample was hard-baked at 120° C. for 30 minutes in a pre-heated oven.
  g. The exposed silicon nitride was dry etched using $CHF_3$ in AME 8110 Plasma Etcher.
  h. The remaining photoresist was stripped using oxygen plasma at 373K for 30 minutes in Branson/IPC4000 Photoresist Stripper.
(3) Potassium hydroxide (KOH) etching of silicon wafer
  a. Patterned wafers were etched by 30 wt % KOH solution at 353K for 4 hours with well stirring so that a thin silicon layer (around 50 um) was produced.
(4) Seeding of the prepared wafer
  a. Spin-coating a 0.05M 3-mercaptopropyl trimethoxysilane (Aldrich, 95%) in ethanol (Merck, 99.5%) on the patterned substrate at ≧3000 rpm using P-6000 Spin-Coater (Specialty coating system, Inc.).
  b. Spin-coating a 0.5 wt % seed solution prepared by Example 1a at ≧3000 rpm using P-6000 Spin-Coater (Specialty coating system, Inc.).
  c. The seeded substrate was dried at 65° C. oven for 10 minutes.
  d. Steps a to c were repeated.
(5) Zeolite growth on the seeded wafer by the method described in Example 1b. The growth of zeolite was repeated to achieve certain thickness.
(6) The wafers were put into TMAH bath at 80° C. to etch away the thin layer of backside silicon in order to obtain a free-standing zeolite membrane.
(7) Ozone treatment of free-standing zeolite membrane
  a. The sample was placed in a stainless steel container. A heating tape was wrapped on the container. The temperature of the container was controlled by a connected temperature controller and K-type thermocouple. The container consisted of a single inlet and outlet.
  b. The container was heated to 473K with heating rate 1 K/min (although experiments have shown that a temperature of at least 373K is also a workable temperature).
  c. Mixture of oxygen and ozone was directed to the container for certain time. The time was the activation time for the thinner region of the zeolite membrane. The ozone concentration was 106 g/$m^3$ at flow rate of 157.2 $cm^3$/min and 5psi (although experiments have shown that an ozone concentration of 50 g/$m^3$ is also a workable concentration).

d. After the ozone treatment, the container was cooled down by disassembling the setup in room condition.

e. The activated free-standing membrane was detached from the silicon wafer support for further analyses.

Characterization

The removal of the trapped organic templates from zeolites and molecular sieves was monitored using (1) Fourier transform infrared (FTIR) spectroscopy, (2) thermogravimetric and differential thermal analyses (TGA/DTA) and (3) time-of-flight secondary ion mass spectrometry (Tof-SIMS).

(1) FTIR was used to monitor the characteristic bands of trapped organic growth directing agent in the zeolite cages during the treatment process. The characteristic bands of TPA$^+$ molecules in Sil-1 cages are 2880, 2940, 2980 cm$^{-1}$.

Experimental Procedure a. A cleaned wafer was mounted on the sample stage of the Infrared microscope (PerkinElmer, Spectrum GX).

b. Dry air (without moisture and carbon dioxide) was flowing through the wafer during the measurement.

c. The microscope focused on the wafer using visible light mode.

d. After focusing, the light source was changed to IR mode and the area for analysis was adjusted to be 100 um×100 um square.

e. The signal of the IR from the wafer was scanned as background.

f. The zeolite-coated substrate was treated in ozone for a prescribed amount of time using Example 1e.

g. The sample was mounted on a cell and place under the Infrared microscope for analysis.

h. The sample was focused in the microscope in visible light mode.

i. After focusing, the light source was changed to IR mode.

j. The signal of the IR from the sample was scanned.

Figure 9:
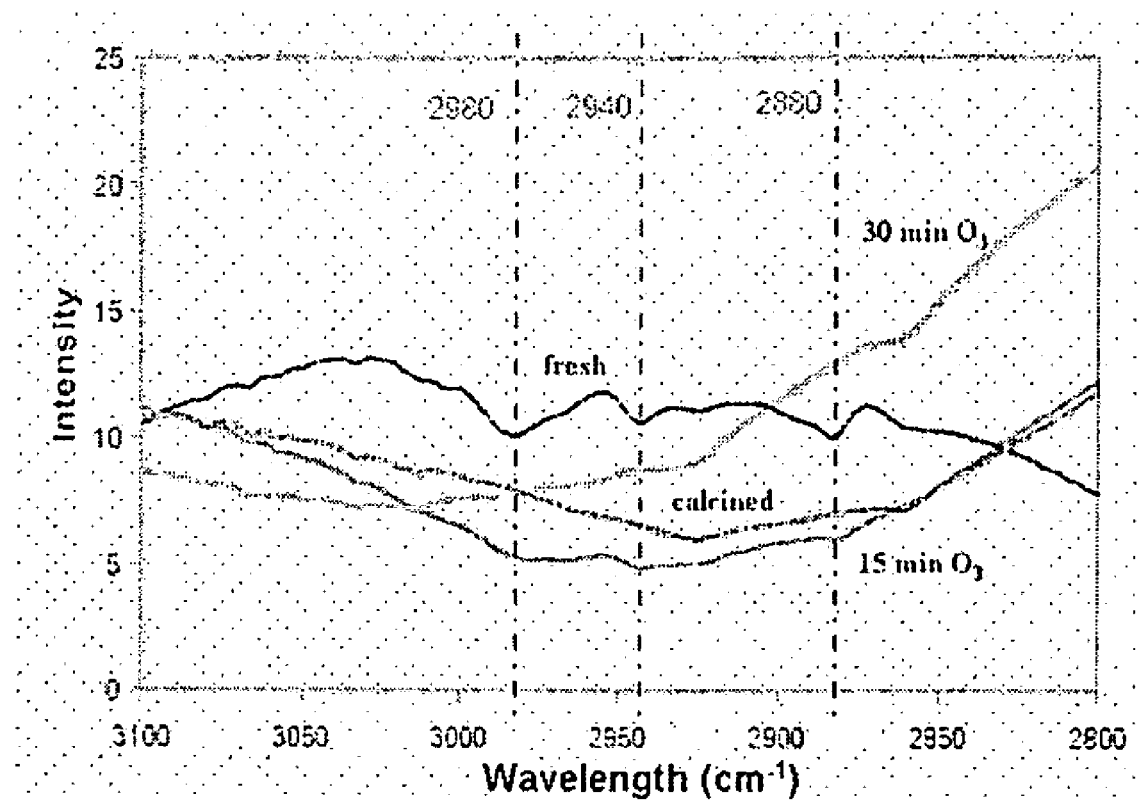
FIG. 9 relates to Example 3 and illustrates FTIR spectra of fresh TPA-Sil-1 sample displaying the characteristic bands of trapped TPA$^+$ molecules at 2980 cm$^{-1}$, 2940 cm$^{-1}$ and 2880 cm$^{-1}$.

FIG. 9 is a graph showing the data from the FTIR. It is shown from the graph that the characteristic bands diminished and disappeared after the treatment of samples in 100 ppm O$_3$ at 200° C. for 15 and 30 minutes, respectively. The FTIR spectra of a sample calcined in air at 550° C. for 12 h was also shown.

(2) TGA/DTA was used to determine the remaining amount of trapped organic growth directing agent in the zeolite cages after the treatment process. It also provides information on the changes in the chemical nature of the trapped molecules. FIG. XX shows the thermogravimetric data for fresh TPA-Sil-1 sample (t=0) and samples treated in ozone for 30, 60 and 120 minutes. The results show that the fresh sample displays the largest weight loss indicating that it has the highest organic content among the samples. The organic content of the sample decreases with ozone treatment. The DTA data shown in the figure inset shows that peak remains unchanged during ozone treatment indicating that ozone process completely oxidizes the organic to carbon dioxide and water without producing fragmentary organic byproducts in the zeolite.

Experimental Procedure a. The zeolite-coated substrate was treated in ozone for a prescribed amount of time using Example 1e.

b. A piece of the sample was cut and ground into powder.

c. A platinum container was half-filled with aluminum oxide and the weight was recorded.

d. The powder of sample was used to fill the platinum container.

e. The weight of the sample including the platinum container and the aluminum oxide was recorded.

f. The container was mounted in the TGA/DTA analyzer (Setaram, 31/1190).

g. Temperature program was set for the analyzer. The temperature range was 298K to 973K with temperature increasing rate at 5 K/min in 20-30 sccm of airflow.

h. Heat generated and the weight loss of the sample was recorded and integrated after the temperature program was finished.

Figure 10:
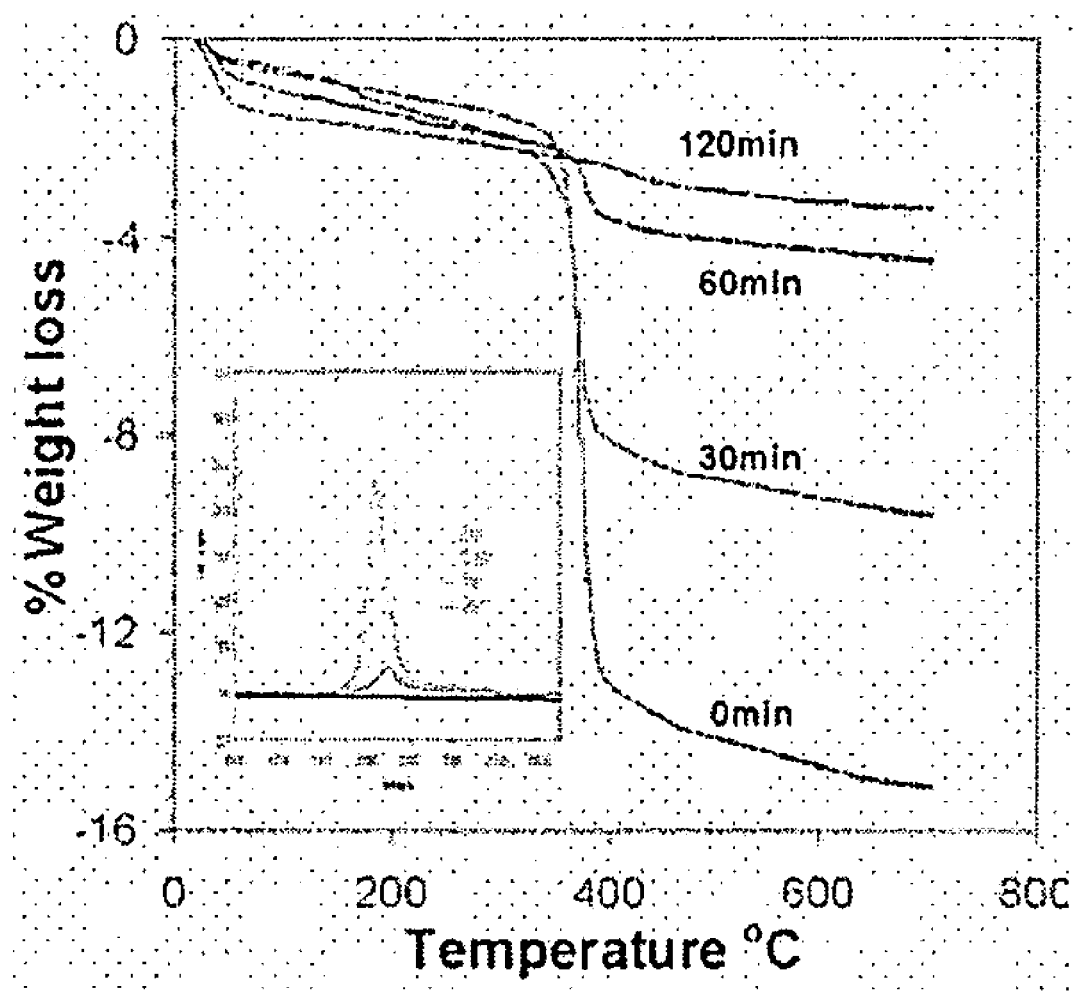
FIG. 10 relates to Example 3 and illustrates thermogravimetric data for samples treated by ozone at 0, 30, 60 and 120 minutes.

FIG. 10 shows the TGA/DTA data of the samples before template removal took place and also at 30, 60 and 120 minutes after template removal began. The samples were heated from 298K to 973K with temperature increasing rate at 5 K/min in 20-30 scan of airflow. The weight loss represented the organic template from the zeolite. The organic template started to burn at around 353K. The attached graph was the heat energy generated from the samples during the heating step.

(2) Tof-SIMS measures the elemental composition of zeolite at different depth to provide a compositional profile of the sample. FIG. XX plots the C/Si ratio as a function of depth for TPA-Sil-1 treated with ozone for 20, 60, 100 and 240 minutes. It is evident from the plots the trapped organics were progressively removed with ozone treatment time.

Experimental Procedure a. The zeolite-coated substrate was treated in ozone for a prescribed amount of time using Example 1e.

b. The sample was mounted on the sample stage of the Tof-SIMS equipment (Physical Electronics, PHI 7200).

c. The chamber containing the sample was maintained at 10-9 Torr by vacuum pumping.

d. Cesium ions were generated at 8 kV. The ions were sputtered on the sample. The bombarded ions and molecules emitted from the sample surface were measured by mass spectrometer in the equipment.

Figure 11:
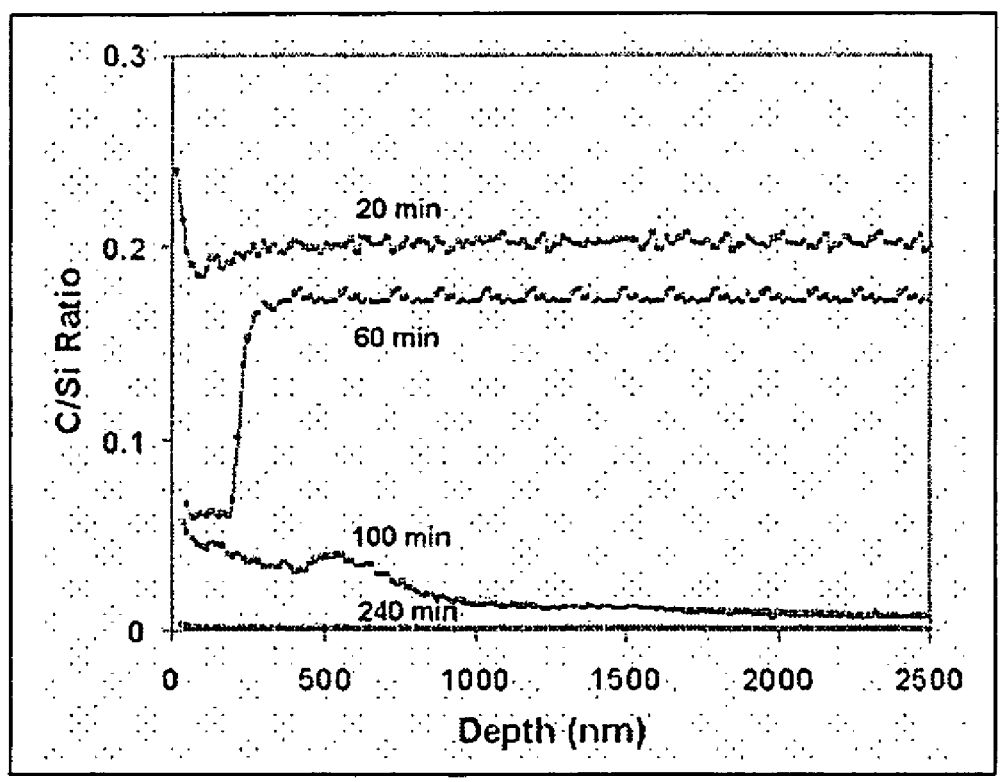
FIG. 11 relates to Example 3 and illustrates Tof-SIMS data for samples treated by ozone for 20, 60, 100 and 240 minutes.

FIG. 11 shows the Tof-SIMS data of the samples treated by ozone for 20, 60, 100, and 240 minutes. The removal of template was revealed by comparing the carbon to silicon ratio (C/Si in y-axis). The decrease in the ratio indicated the amount of organic template in the zeolite.

Example 4

Effect of Ozone Concentration on Removal of Trapped Organic Growth Directing Molecules from Zeolites and Molecular Sieves After showing the effectiveness of ozone treatment, the effect of ozone concentration on the removal of trapped organic growth directing molecules from zeolites and molecular sieves by ozone treatment was studied in this example.

Experimental Procedure (1) Preparation of porous α-alumina tubes purchased from US Filters (the tubes has a nominal pore size of 0.1 um) for growth of zeolite membrane:

a. The α-alumina tubes were cut into 75 mm in length.

b. The tubes were rinsed by DDI water and dried in a 333K oven for overnight.

c. The tubes were calcined at 823K for 8 hours to stabilize the support and burn-off adsorbed organic contaminant, if any.

d. The pores at the ends of the tubes were sealed by coating a thin layer of enamel glaze (Aremco Products) which could withstand high temperature up to 873K.

(2) Seeding of the support (the prepared alumina tubes)
   a. 2.4 ml of 2 wt % ethanol-based zeolite nano-seeds with 100 nm diameter synthesized in Example 1a was applied to the inner surface of the tubes. The solution was kept in the tubes for 5 seconds.
   b. After that, another 2 ml of the seeding solution was applied to the tube by repeating the above procedures.
   c. The slip-casted tubes were dried overnight in humid air to prevent rapid drying which could cause crack formation of the seed layer.
   d. The tubes were then dried in 333K oven for overnight.
   e. The seeded tubes were calcined in air at 623K for 24 hours. The temperature changing rate was 2 (K/min).
(3) Zeolite (Sil-1) growth on the seeded alumina tubes by the method described in Example 1b.
(4) Ozone activation of zeolite membrane on the alumina tubes:
   a. The zeolite-membrane supported on alumina tube was placed in a stainless steel housing in which rubber and graphite rings were used to provide a leak-free system for gas flow through the tube. The stainless steel consisted of inlet and outlet for retentate to flow through the tube. A single outlet was built for permeate.
   b. The setup was wrapped by heating tape (Thermolyne Briskheat) which was controlled by temperature controller (RKC) and thermocouple (Omega, K-type). The temperature of the vessel increased to 473K with temperature increasing rate 1 (K/min).
   c. When the temperature reached 473K, pure oxygen or oxygenozone gas stream was fed to the unit at a constant flow rate of 250 ($cm^3$/min). The ozone concentration could be controlled by adjusting the power of the ozone generator (Trailigas, Ozonconcept OZC 1002). The gas pressure inside the tube was kept at 1.2 bar during the ozone treatment.
   d. The gas permeation flux was measured at fixed time intervals during the ozone treatment in order to monitor the progress of the template removal from the zeolite pores.
   e. After ozone treatment, the setup was cooled down at the rate of 1 (K/min) to room temperature.

Figure 12:
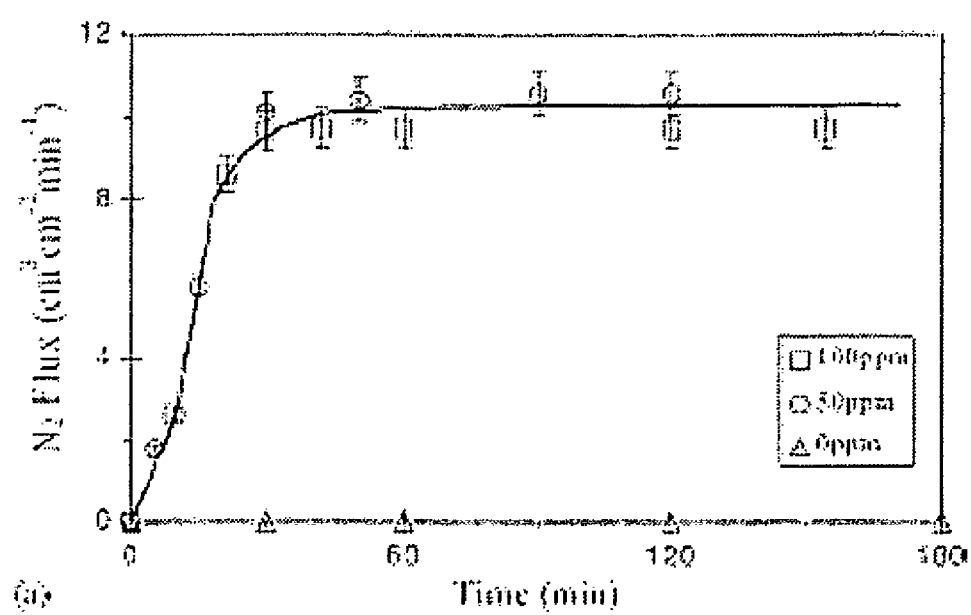
FIG. 12 relates to Example 4 and illustrates activation of zeolite membrane with different ozone concentrations.

FIG. 12 shows the activation of zeolite membrane with different ozone concentrations. It is shown that the ozone concentration at about 50 ppm or above is sufficient to achieve an optimal activation.

Example 5

Effect of Temperature on Removal of Trapped Organic Growth Directing Molecules from Zeolites and Molecular Sieves The effect of temperature for activating zeolite membrane by the ozone treatment was studied in this example.

Experimental Procedure
(1) Preparation of porous α-alumina tubes purchased from US Filters (the tubes has a nominal pore size of 0.1 um) for growth of zeolite membrane:
   a. The α-alumina tubes were cut into 75 mm in length.
   b. The tubes were rinsed by DDI water and dried in a 333K oven for overnight.
   c. The tubes were calcined at 823K for 8 hours to stabilize the support and burn-off adsorbed organic contaminant, if any.
   d. The pores at the ends of the tubes were sealed by coating a thin layer of enamel glaze (Aremco Products) which could withstand high temperature up to 873K.
(2) Seeding of the support (the prepared alumina tubes)
   a. 2.4 ml of 2 wt % ethanol-based zeolite nano-seeds with 100 nm diameter synthesized in Example I a was applied to the inner surface of the tubes. The solution was kept in the tubes for 5 seconds.
   b. After that, another 2 ml of the seeding solution was applied to the tube by repeating the above procedures.
   c. The slip-casted tubes were dried overnight in humid air to prevent rapid drying which could cause crack formation of the seed layer.
   d. The tubes were then dried in 333K oven for overnight.
   e. The seeded tubes were calcined in air at 623K for 24 hours. The temperature changing rate was 2 (K/min).
(3) Zeolite (Sil-1) growth on the seeded alumina tubes by the method described in Example 1b.
(4) Ozone activation of zeolite membrane on the alumina tubes:
   a. The zeolite-membrane supported on alumina tube was placed in a stainless steel housing in which rubber and graphite o-rings were used to provide a leak-free system for gas flow through the tube. The stainless steel consisted of inlet and outlet for retentate to flow through the tube. A single outlet was built for permeate.
   b. The setup was wrapped by heating tape (Thermolyne Briskheat) which was controlled by temperature controller (RKC) and thermocouple (Omega, K-type). The temperature of the vessel increased to the designed temperature (298, 323, 343, 373, 423 or 473K) with temperature increasing rate 1 (K/min).
   c. When the temperature reached the desired temperature, pure oxygen or oxygen-ozone gas stream was fed to the unit at a constant flow rate of 250 ($cm^3$/min). The ozone concentration was kept at 100 ($g/m^3$). The gas pressure inside the tube was kept at 1.2 bar during the ozone treatment.
   d. The gas permeation flux was measured at fixed time intervals during the ozone treatment in order to monitor the progress of the template removal from the zeolite pores.
   e. After ozone treatment, the setup was cooled down at the rate of 1 (K/min) to room temperature.

Figure 13:
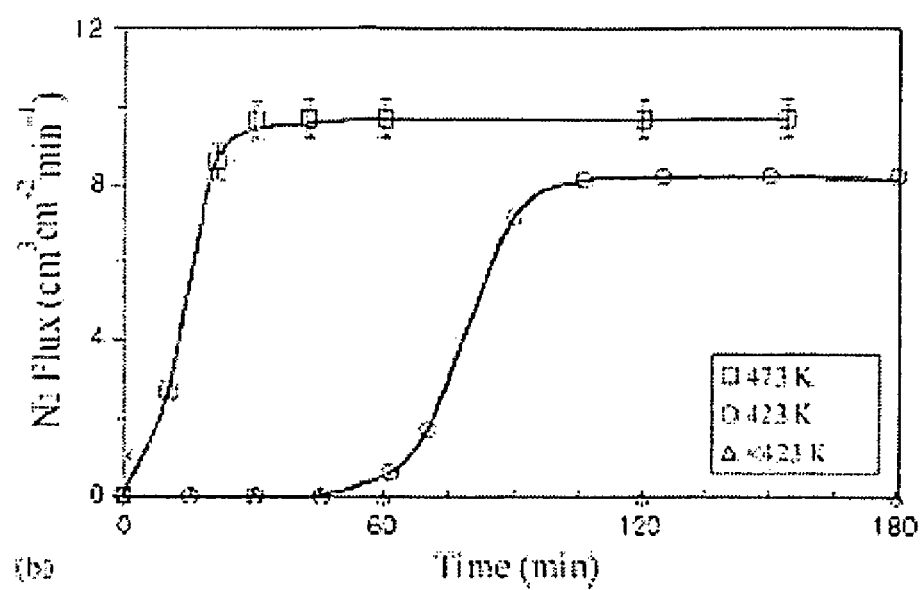
FIG. 13 relates to Example 5 and illustrates activation of zeolite membrane at different temperature.

FIG. 13 summarizes the effect of temperature on activation of zeolite membrane. It is shown that a temperature of 423K or above is generally satisfactory although if the temperature is adjusted to 473K then the time required for activation can be shortened.

Example 6

Effect of Membrane Thickness on Removal of Trapped Organic Growth Directing Molecules from Zeolites and Molecular Sieves The effect of membrane thickness for activating zeolite membrane by the ozone treatment was studied in this example.

Experimental Procedure
(1) Preparation of porous α-alumina tubes purchased from US Filters (the tubes has a nominal pore size of 0.1 um) for growth of zeolite membrane:
   a. The α-alumina tubes were cut into 75 mm in length.
   b. The tubes were rinsed by DDI water and dried in a 333K oven for overnight.

c. The tubes were calcined at 823K for 8 hours to stabilize the support and burn-off adsorbed organic contaminant, if any.
d. The pores at the ends of the tubes were sealed by coating a thin layer of enamel glaze (Aremco Products) which could withstand high temperature up to 873K.

(2) Seeding of the support (the prepared alumina tubes)
  a. 2.4 ml of 2 wt % ethanol-based zeolite nano-seeds with 100 nm diameter synthesized in Example 1a was applied to the inner surface of the tubes. The solution was kept in the tubes for 5 seconds.
  b. After that, another 2 ml of the seeding solution was applied to the tube by repeating the above procedures.
  c. The slip-casted tubes were dried overnight in humid air to prevent rapid drying which could cause crack formation of the seed layer.
  d. The tubes were then dried in 333K oven for overnight.
  e. The seeded tubes were calcined in air at 623K for 24 hours. The temperature changing rate was 2 (K/min).

(3) Zeolite (Sil-1) growth on the seeded alumina tubes by the method described in Example 1b. Different zeolite thicknesses were achieved by repetitive growth of the zeolite membrane.

(4) Ozone activation of zeolite membrane on the alumina tubes:
  a. The zeolite-membrane supported on alumina tube was placed in a stainless steel housing in which rubber and graphite o-rings were used to provide a leak-free system for gas flow through the tube. The stainless steel consisted of inlet and outlet for retentate to flow through the tube. A single outlet was built for permeate.
  b. The setup was wrapped by heating tape (Thermolyne Briskheat) which was controlled by temperature controller (RKC) and thermocouple (Omega, K-type). The temperature of the vessel increased to 473K with temperature increasing rate 1 (K/min).
  c. When the temperature reached 473K, pure oxygen or oxygen-ozone gas stream was fed to the unit at a constant flow rate of 250 ($cm^3$/min). The ozone concentration was kept at 100 (g/$m^3$). The gas pressure inside the tube was kept at 1.2 bar during the ozone treatment.
  d. The gas permeation flux was measured at fixed time intervals during the ozone treatment in order to monitor the progress of the template removal from the zeolite pores.
  e. After ozone treatment, the setup was cooled down at the rate of 1 (K/min) to room temperature.

Figure 14:
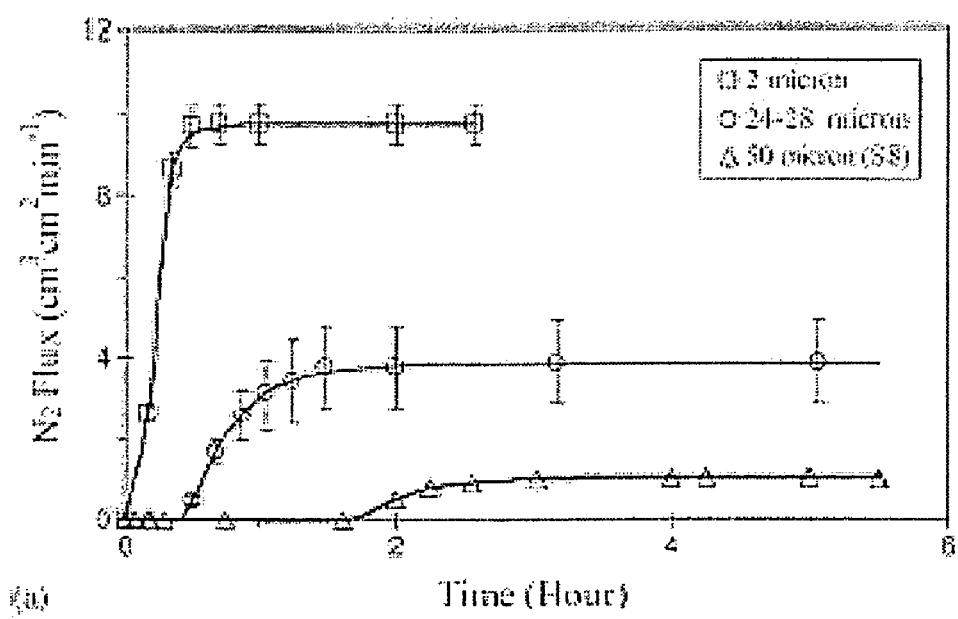
FIG. 14 relates to Example 6 and illustrates activation of zeolite membrane with different membrane thickness.

FIG. 14 summarizes the effect membrane thickness on removal of organic templates from the membrane. In particular, it is shown that a relatively short time is required to remove the template from thinner membranes (e.g. 2 micron).

Example 7

Effect of Membrane Composition on Removal of Trapped Organic Growth Directing Molecules from Zeolites and Molecular Sieves The effect of membrane composition for activating zeolite membrane by the ozone treatment was studied in this example.

Experimental Procedure
(1) Preparation of porous α-alumina tubes purchased from US Filters (the tubes has a nominal pore size of 0.1 um) for growth of zeolite membrane:
  a. The α-alumina tubes were cut into 75 mm in length.
  b. The tubes were rinsed by DDI water and dried in a 333K oven for overnight.
  c. The tubes were calcined at 823K for 8 hours to stabilize the support and burn-off adsorbed organic contaminant, if any.
  d. The pores at the ends of the tubes were sealed by coating a thin layer of enamel glaze (Aremco Products) which could withstand high temperature up to 873K.

(2) Seeding of the support (the prepared alumina tubes)
  a. 2.4 ml of 2 wt % ethanol-based zeolite nano-seeds with 100 nm diameter synthesized in Example 1a was applied to the inner surface of the tubes. The solution was kept in the tubes for 5 seconds.
  b. After that, another 2 ml of the seeding solution was applied to the tube by repeating the above procedures.
  c. The slip-casted tubes were dried overnight in humid air to prevent rapid drying which could cause crack formation of the seed layer.
  d. The tubes were then dried in 333K oven for overnight.
  e. The seeded tubes were calcined in air at 623K for 24 hours. The temperature changing rate was 2 (K/min).

(3) Zeolite (Sil-1) growth on the seeded alumina tubes by the method described in Example 1b. Sil-1 and ZSM-5 zeolite membrane were grown on the support for this study.

(4) Ozone activation of zeolite membrane on the alumina tubes:
  a. The zeolite-membrane supported on alumina tube was placed in a stainless steel housing in which rubber and graphite o-rings were used to provide a leak-free system for gas flow through the tube. The stainless steel consisted of inlet and outlet for retentate to flow through the tube. A single outlet was built for permeate.
  b. The setup was wrapped by heating tape (Thermolyne Briskheat) which was controlled by temperature controller (RKC) and thermocouple (Omega, K-type). The temperature of the vessel increased to 473K with temperature increasing rate 1 (K/min).
  c. When the temperature reached 473K, pure oxygen or oxygenozone gas stream was fed to the unit at a constant flow rate of 250 ($cm^3$/min). The ozone concentration was kept at 100 (g/$m^3$). The gas pressure inside the tube was kept at 1.2 bar during the ozone treatment.
  d. The gas permeation flux was measured at fixed time intervals during the ozone treatment in order to monitor the progress of the template removal from the zeolite pores.
  e. After ozone treatment, the setup was cooled down at the rate of 1 (K/min) to room temperature.

Figure 15:
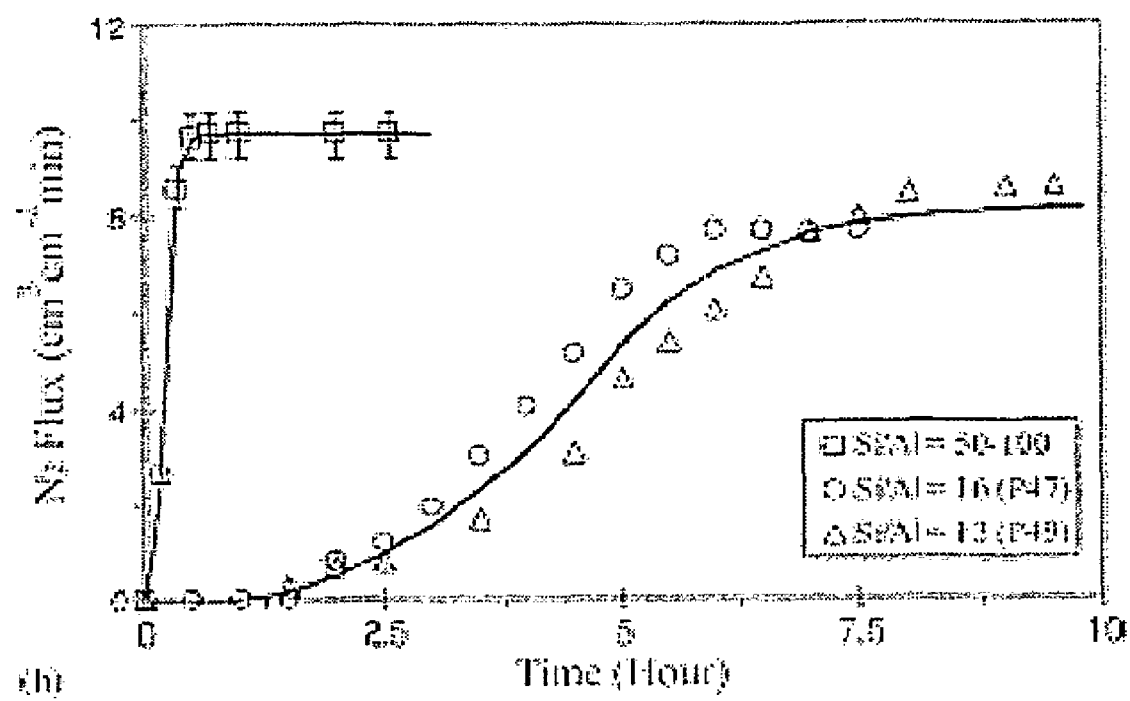
FIG. 15 relates to Example 7 and illustrates activation of zeolite membrane with different compositions.
Figure 16:
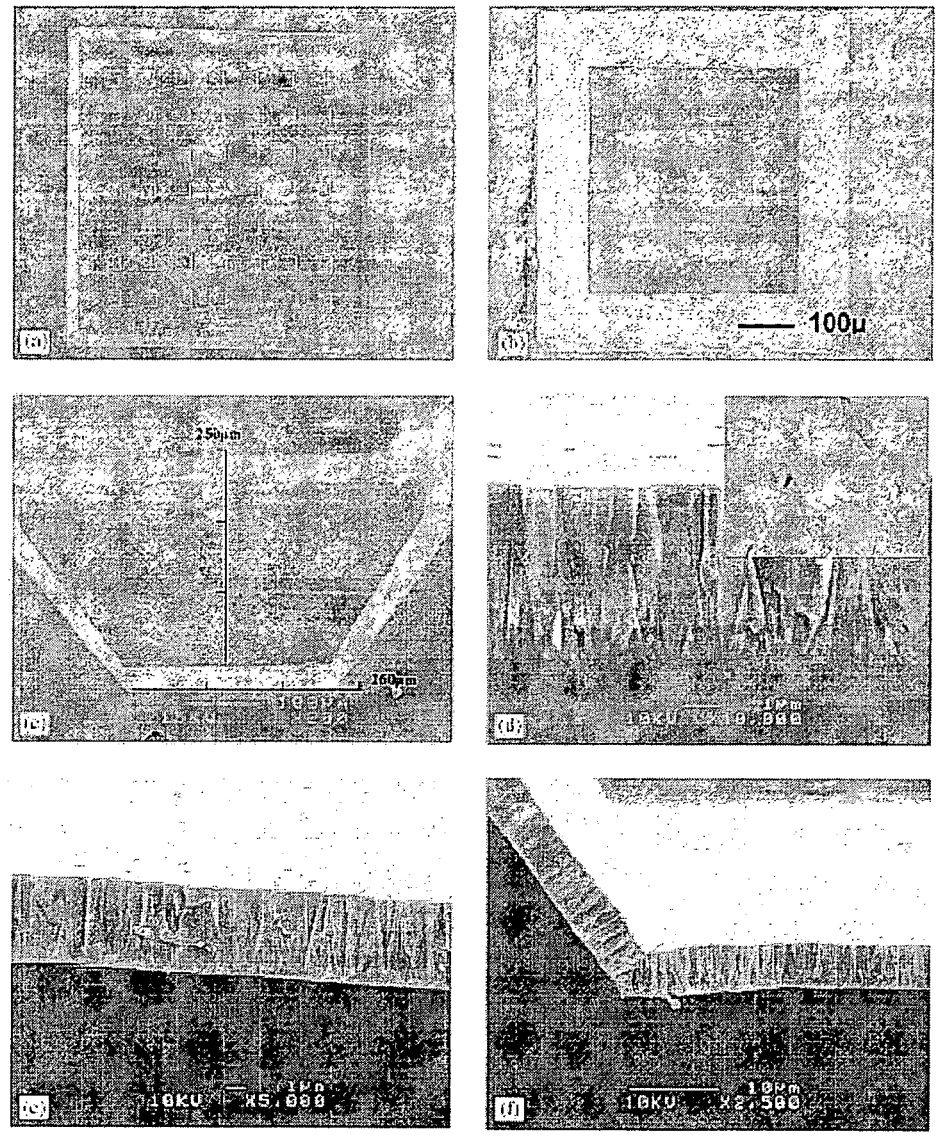
FIGS. 16(a) to (f) relate to Example 8 and illustrate SEM images of free-standing zeolite micromembrane.

FIG. 15 summarizes the effect of the composition of the membrane (Si:Al) on the activation thereof. In particular, it is shown that a relatively high ration of Si/Al will facilitate the activation.

Example 8

Fabrication of Zeolite Micromembrane

Free-standing zeolite micromembrane was fabricated on silicon substrate. The micromembrane unit was tested for gas permeation and separation.

Experimental Procedure
(1) Preparation of silicon wafer
  a. Silicon wafer (e.g. <100>, <101>, <110> and polycrystalline Si) was used as substrate. The wafer was pre-cleaned by Piraha solution (H2SO4:H2O2 with 10:1 ratio) at 130° C. for 10 minutes and rinsed with distilled, deionized (DDI) water.

b. The native oxide was removed by hydrofluoric acid at room temperature for 1 minute.
c. The wafer was dried using compressed nitrogen. After drying, 500 nm layer of silicon nitride was deposited on the wafer by chemical vapor deposition using Thermco TMX 9001 LPCVD.

(2) The desired pattern was transferred on the substrate using standard lithographic process:
   a. HMDS priming for 10 minutes.
   b. Spin-coating of 2 μm layer photoresist (HPR207) on the wafer at 4000 rpm for 30 seconds using Solitec 5110-C/PD Wafer Spinner.
   c. The photoresist was soft-baked at 110° C. for 1 minute on a pre-heated heat plate.
   d. The pattern mask was aligned on the wafer and exposed to UV light for 17 seconds using AB-Manufacturing Contact Aligner.
   e. The photoresist was developed using FHD-5 for 2.5 minutes.
   f. The sample was hard-baked at 120° C. for 30 minutes in a pre-heated oven.
   g. The above patterning procedure was repeated to make micropattern on the backside of the wafer. The patterns on both sides were matched each other by aid of optical microscope before UV exposure.
   h. After the patterning, the exposed silicon nitride was dry etched using $CHF_3$ in AME 8110 Plasma Etcher.
   i. The remaining photoresist was stripped using oxygen plasma at 100° C. for 30 minutes in Branson/IPC4000 Photoresist Stripper.

(3) Potassium hydroxide (KOH) etching of silicon wafer
   a. Patterned wafer was etched by 30 wt % KOH solution at 353K for 4 hours with well stirring so that a thin silicon layer (around 50um) was produced.

(4) Seeding of the prepared wafer
   a. Spin-coating a 0.05M 3-mercaptopropyl trimethoxysilane (Aldrich, 95%) in ethanol (Merck, 99.5%) on the patterned substrate at ≧3000 rpm using P-6000 Spin-Coater (Specialty coating system, Inc.).
   b. Spin-coating a 0.5 wt % seed solution prepared by Example 1a at ≧3000 rpm using P-6000 Spin-Coater (Specialty coating system, Inc.).
   c. The seeded substrate was dried at 65° C. oven for 10 minutes.
   d. Steps a to c were repeated.

(5) Zeolite growth on the seeded wafer by the method described in Example 1b.

(6) The wafers were put into TMAH bath at 80° C. to etch away the thin layer of backside silicon in order to obtain a free-standing zeolite membrane.

(7) Ozone treatment of the free-standing zeolite membrane
   a. The sample was placed in a stainless steel container. A heating tape was wrapped on the container. The temperature of the container was controlled by a connected temperature controller and K-type thermocouple. The container consisted of a single inlet and outlet.
   b. The container was heated to 473K with heating rate 1 (K/min).
   c. Mixture of oxygen and ozone was directed to the container for certain time. The time was the activation time for the thinner region of the zeolite membrane. The ozone concentration was 106 (g/$m^3$) at flow rate of 157.2 ($cm^3$/min) and 5 psi.
   d. After the ozone treatment, the container was cooled down at a temperature decreasing rate of 1 (K/min).

(8) Gas permeation
   a. A permeation setup were conducted in a glass Wicke-Kallenbach cell.
   b. The micromembrane was sandwiched between two mating sections of glass cells.
   c. Gases were directed to flow through the inlet and outlet of the cell. Helium, hydrogen, nitrogen and argon gas used for the permeation were Ultra-high purity from CWIG while methane (99.5%, HKSCG) and n-butane (99.9%, HKSCG) were another two gases used for the study.
   d. The gas flow was maintained above 250 ($cm^3$/min) and the pressure was at 1.4 bar. The experiments were carried out without sweep gas and the permeate flux was measured at ambient pressure by a home-made bubble flowmeter.
   e. The temperature of the setup was monitored by a K-type thermocouple and the temperature was maintained at 373K by a heating tape (Briskheat®) and a temperature controller (RKS, REX-C100). Helium gas (~30 $cm^3$/min) purged the system for 3 hours. This step was used to remove any moisture or other adsorbed gases from the zeolite membrane.
   f. The permeance of the gases were measured at room temperature, 323K at a constant trans-membrane pressure gradient of 0.4 barg using a bubble flowmeter.
   g. The permeance of each gas was measured for three times to reduce the measurement errors.
   h. A gas mixture containing 61.7% hydrogen, 12.3% methane and 26.0% carbon dioxide was used to study the gas separation performance of the zeolite micromembrane. The permeate was analyzed using an online gas chromatograph (HP 6890) equipped with thermal conductivity and flame ionization detectors in series and a CTR 1 column (Altech).

FIGS. 16(a) to (f) are SEM images of the free-standing zeolite micromembrane fabricated from the above example.

Figure 17:
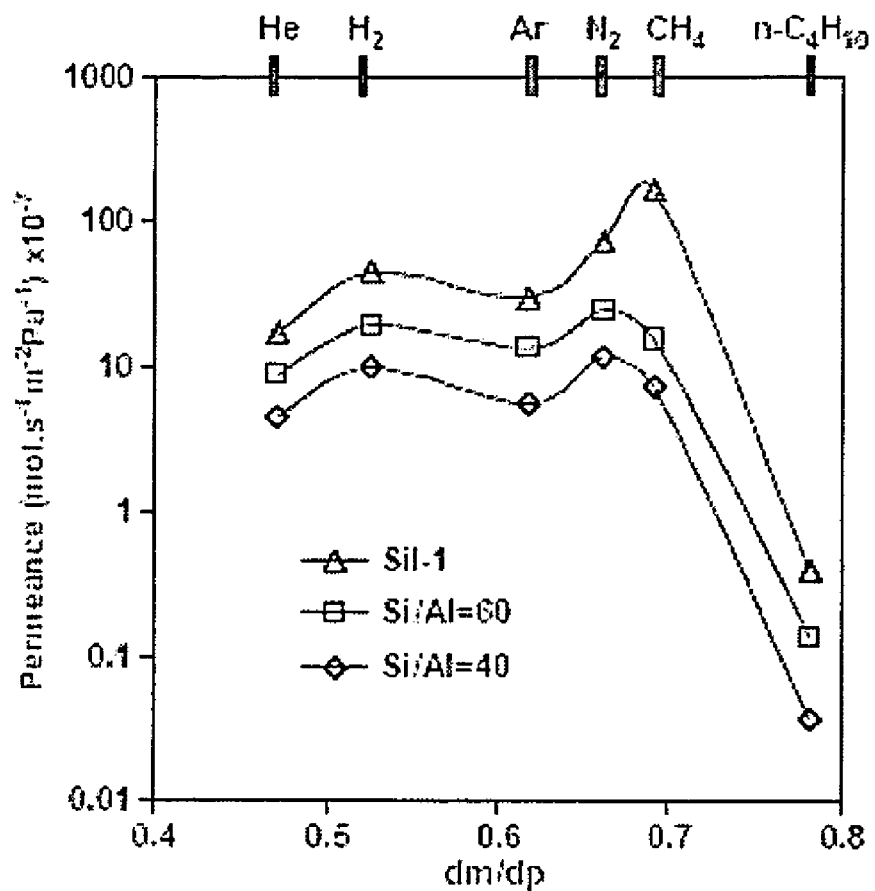
FIG. 17 relates to Example 8 and illustrates the relationship of plots of single gas permeance as a function of the ratio of kinetic diameter of the gas molecule and the average zeolite pore size (i.e. 5.5 A) for ZSM-5 micromembrane with different aluminum content.

FIG. 17 shows the plots of single gas permeance as a function of the ration of kinetic diameter of the gas molecule and the average zeolite pore size (i.e. %.%A) for ZSM-5 micromembrane with different aluminum content. IN particular, it is shown that membranes having a lower Al content has higher permeance.

FIG. 18 shows the result of gas separation using the zeolite micromembrane.

Example 9

Fabrication of Zeolite Membrane-enclosed Microcavity by Thickness Difference of Zeolite Membrane In Example 6, the result showed that the thicker zeolite membrane required longer ozone treatment time to activate the membrane. This property can be applied to fabricate zeolite membrane enclosed microstructure. Herein, the fabrication process is described.

Experimental Procedure
(1) Preparation of silicon wafer
   a. Silicon wafer (e.g. <100>, <101>, <110> and polycrystalline Si) was used as substrate. The wafer was pre-cleaned by Piraha solution ($H_2SO_4$:$H_2O_2$ with 10:1 ratio) at 130° C. for 10 minutes and rinsed with distilled, deionized (DDI) water.
   b. The native oxide was removed by hydrofluoric acid at room temperature for 1 minute.
   c. The wafer was dried using compressed nitrogen.

(2) Seeding of the prepared wafer
   a. 30 ul of 0.05M 3-mercaptopropyl trimethoxysilane (Aldrich, 95%) in ethanol (Merck, 99.5%) was spin-coated on the patterned substrate at 3000 rpm using P-6000 Spin-Coater (Specialty coating system, Inc.).
   b. 30 ul of 0.5 wt. % seed solution prepared by Example 1a was spin-coated on the wafer at 3000 rpm using P-6000 Spin-Coater (Specialty coating system, Inc.).
   c. The seeded substrate was dried at 338K oven for 10 minutes.
   d. Step a to c were repeated.
(3) The zeolite film was grown on the seeded substrate by synthesis procedure described in Example 1b.
(4) Micropatterns transfer to the zeolite membrane by photolithography
   a. HMDS priming for 10 minutes.
   b. Spin-coating of 2 μm layer photoresist (HPR207) on the wafer at 4000 rpm for 30 seconds using Solitec 5110-C/PD Wafer Spinner.
   c. The photoresist was soft-baked at 110° C. for 1 minute on a pre-heated heat plate.
   d. The pattern mask was aligned on the wafer and exposed to UV light for 17 seconds using AB-Manufacturing Contact Aligner.
   e. The photoresist was developed using FHD-5 for 2.5 minutes.
   f. The sample was hard-baked at 120° C. for 30 minutes in a pre-heated oven.
   g. The sample was etched by BOE solution for certain time depending on the desired depth of the zeolite to be etched.
   h. The photoresist on the sample was stripped by acetone rinsing.
(5) Ozone treatment of zeolite membrane
   a. The sample was placed in a stainless steel container. A heating tape was wrapped on the container. The temperature of the container was controlled by a connected temperature controller and K-type thermocouple. The container consisted of a single inlet and outlet.
   b. The container was heated to 403K with heating rate 1 (K/min).
   c. Mixture of oxygen and ozone was directed to the container for certain time. The time was the activation time for the thinner region of the zeolite membrane. The ozone concentration was 106 (g/m$^3$) at flow rate of 157.2 (cm$^3$/min) at 3 psi.
   d. After the ozone treatment, the container was cooled down by disassembling the setup in room condition.
(6) Formation of zeolite membrane-enclosed microstructure
   a. The zeolite-coated substrate was placed in a Teflon holder horizontally and immersed in a pre-heated (55-80° C.) TMAH solution (5-25 wt. %) (25%, Moses Lake) for a pre-set time (0-8 hours).
   b. The sample was taken out from the solution and rinsed by DDI water to remove the remained TMAH solution on the samples.
   c. After that, the sample was immersed in 200 ml of DDI water overnight to remove the trapped TMAH molecules in the microcavity by diffusion.

Characterization
(1) Scanning electron microscope (SEM)
   a. The sample was carefully cross-sectioned using a diamond scriber and cleaned with DDI water and ethanol to remove dirt and contaminants,
   b. The sectioned sample was mounted standing on an copper stub using conducting adhesives and silver paste before sputter-coating (Denton, DESK II) 20 nm Au,
   c. SEM (JEOL, JSM 6300) images of the cross-section were imaged from the standing sample to reveal the depth and size of the etching.

Figure 19A:
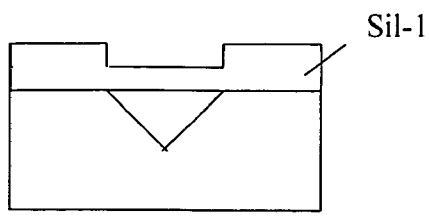
FIG. 19a is a schematic diagram and FIG. 19b is a SEM image of a zeolite membrane enclosed microchannel fabricated by Example 10, both of which relate to Example 9.
Figure 19B:
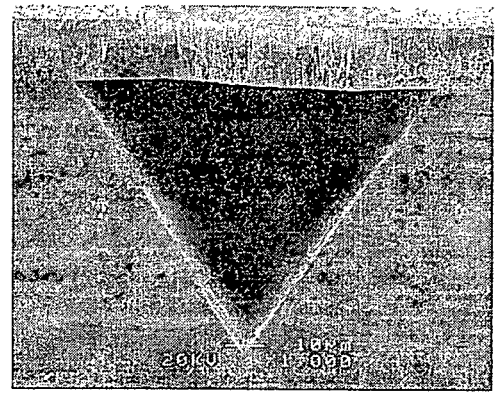

FIGS. 19(a) and (b) show a schematic diagram and a SEM image of a zedite membrane-enclosed microchannel of Example 9.

Example 10

Fabrication of Zeolite Membrane-enclosed Microcavity by Compositional Difference of Zeolite Membrane According to the result of Example 7, the zeolite composition affects the time for ozone activation. Similar to Example 9, the zeolite membrane-enclosed microstructure is fabricated in an alternative method.

Experimental Procedure
(1) Preparation of silicon wafer
   a. Silicon wafer (e.g. <100>, <101>, <110>and polycrystalline Si) was used as substrate. The wafer was pre-cleaned by sulphuric acid at 130° C. for 10 minutes and rinsed with distilled, deionized (DDI) water.
   b. The native oxide was removed by hydrofluoric acid at room temperature for 1 minute.
   c. The wafer was dried using compressed air.
(2) Seeding of the prepared wafer
   a. 30 ul of 0.05M 3-mercaptopropyl trimethoxysilane (Aldrich, 95%) in ethanol (Merck, 99.5%) was spin-coated on the patterned substrate at 3000 rpm using P-6000 Spin-Coater (Specialty coating system, Inc.).
   b. 30 ul of 0.5 wt. % seed solution prepared by Example 1a was spin-coated on the wafer at 3000 rpm using P-6000 Spin-Coater (Specialty coating system, Inc.).
   c. The seeded substrate was dried at 338K oven for 10 minutes.
   d. Step a to c were repeated.
(3) The zeolite (Sil-1) film was grown on the seeded substrate by synthesis procedure described in Example 1b.
(4) Micropatterns transfer to the zeolite membrane by photolithography
   a. HMDS priming for 10 minutes.
   b. Spin-coating of 4 μm layer photoresist (AZ4620) on the wafer at 4000 rpm for 30 seconds using Solite 5110-C/PD Wafer Spinner.
   c. The photoresist was soft-baked at 110° C. for 1 minute on a pre-heated heat plate.
   d. The pattern mask was aligned on the wafer and exposed to UV light for 17 seconds using AB-Manufacturing Contact Aligner.
   e. The photoresist was developed using FHD-5 for 2.5 minutes.
   f. The sample was hard-baked at 120° C. for 30 minutes in a pre-heated oven.
   g. The photoresist was aged for 6 days in room conditions.
(5) A zeolite (ZSM-5) film was grown on the patterned substrate by synthesis procedure described in Example 1b.
(6) Ozone treatment of zeolite membrane
   a. The sample was placed in a stainless steel container. A heating tape was wrapped on the container. The temperature of the container was controlled by a connected temperature controller and K-type thermocouple. The container consisted of a single inlet and outlet.

b. The container was heated to 403K with heating rate 1 (K/min),
c. Mixture of oxygen and ozone was directed to the container for certain time. The time was the activation time for the thinner region of the zeolite membrane. The ozone concentration was 106 (g/m$^3$) at flow rate of 157.2 (cm$^3$/min) at 3 psi.
d. After the ozone treatment, the container was cooled down by disassembling the setup in room condition.

(7) Formation of zeolite membrane-enclosed microstructure
a. The zeolite-coated substrate was placed in a Teflon holder horizontally and immersed in a pre-heated (55-80° C.) TMAH solution (5-25 wt. %) (25%, Moses Lake) for a pre-set time (0-8 hours).
b. The sample was taken out from the solution and rinsed by DDI water to remove the remained TMAH solution on the samples.
c. After that, the sample was immersed in 200 ml of DDI water overnight to remove the trapped TMAH molecules in the microcavity by diffusion.

Characterization
(1) Scanning electron microscope (SEM)
a. The sample was carefully cross-sectioned using a diamond scriber and cleaned with DDI water and ethanol to remove dirt and contaminant.
b. The sectioned sample was mounted standing on an copper stub using conducting adhesives and silver paste before sputter-coating (Denton, DESK II) 20 m Au.
c. SEM (JEOL, JSM 6300) images of the cross-section were imaged from the standing sample to reveal the depth and size of the etching.

Figure 20A:
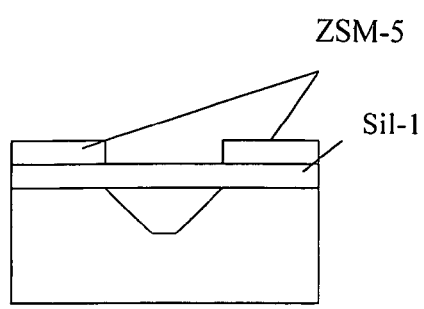
Figure 20B:
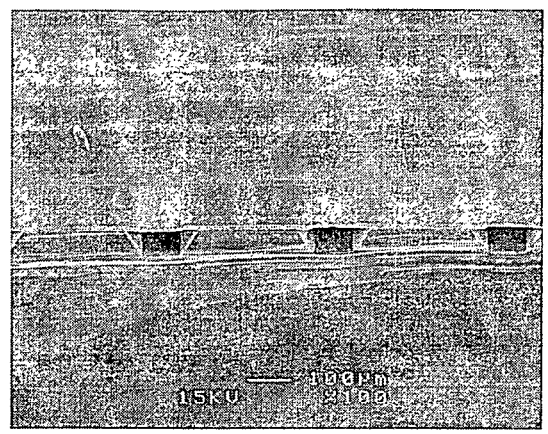

FIGS. 20(a) and (b) are a schematic diagram and a SEM image of the zeolite membrane-enclosed microchannel. The microchannel was etched by 25% TMAH at 60° C. for 8 hours.

Figure 21A:
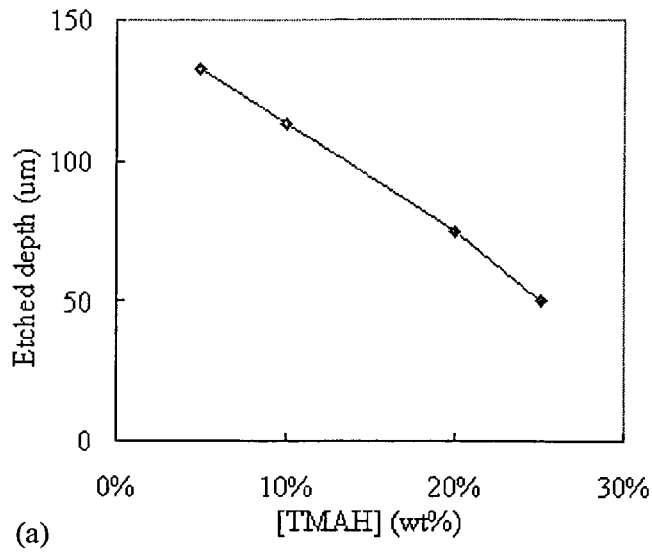
FIGS. 21 (a) and (b) relate to Example 10 and are graphs showing the relationship between (a) TMAH concentration and the etched depth of the microstructure and (b) etching temperature and the etched depth.
Figure 21B:
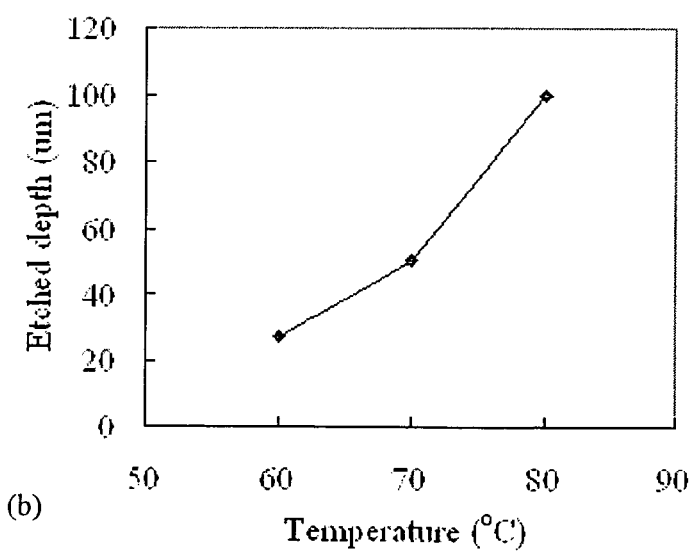

FIGS. 21 (a) and (b) are graphs showing the TMAH concentration and etched depth, and the etching temperature and the etched depth. It is shown that the higher the THAH concentration and larger the etched depth, and the higher the etching temperature the larger the etched depth.

Example 11

Fabrication of Open-tip Zeolite Microneedle

Instead of microcavity, zeolite membrane-enclosed microneedle can be fabricated. In the fabrication process, the zeolite membrane is grown on the wafer which has micropillars of SU-8 photoresist. The zeolite grown on the SU-8 is activated by ozone treatment, the SU-8 polymer was removed at the same time.

Experimental Procedure
(1) Preparation of silicon wafer
a. Silicon wafer (e.g. <100>, <101>, <110>and polycrystalline Si) was used as substrate. The wafer was pre-cleaned by Piraha solution (H$_2$SO$_4$:H$_2$O$_2$ with 10:1 ratio) at 130° C. for 10 minutes and rinsed with distilled, deionized (DDI) water.
b. The native oxide was removed by hydrofluoric acid at room temperature for 1 minute.
c. The wafer was dried using compressed air.
(2) Transfer of micropatterns to the wafer
a. Spin-coating of 200 µm layer photoresist (SU-8 2075, Microchem) on the wafer at 1000 rpm for 30 seconds using Solitec 5110-C/PD Wafer Spinner.
b. The photoresist was soft-baked at 60° C. for 10 minutes and subsequently 90° C. for 30 minutes on a pre-heated heat plate.
c. After soft-bake, the wafer was cooled down and aged in room conditions for 10 minutes.
d. The pattern mask was aligned on the wafer and exposed to UV light for 30 seconds using AB-Manufacturing Contact Aligner.
e. The exposed photoresist was undergone post-exposure-bake undergo on 60° C. hotplate for 10 minutes and 95° C. hotplate for 30 minutes followed by 10 minutes cooling at room temperature.
f. The photoresist was developed using SU-8 developer (Microchem) for 20 minutes and followed by rinsing using isopropanol.
g. Then the wafer was dried with nitrogen stream.
(3) Seeding of the prepared wafer
a. 30 ul of 0.05M 3-mercaptopropyl trimethoxysilane (Aldrich, 95%) in ethanol (Merck, 99.5%) was spin-coated on the patterned substrate at 3000 rpm using P-6000 Spin-Coater (Specialty coating system, Inc.).
b. 30 ul of 0.5 wt. % seed solution prepared by Example 1a was spin-coated on the wafer at 3000 rpm using P-6000 Spin-Coater (Specialty coating system, Inc.).
c. The seeded substrate was dried at 338K oven for 10 minutes.
d. Step a to c were repeated.
(4) Zeolite was grown on the prepared wafer as described in Example 1b.
(5) Ozone treatment of zeolite membrane
a. The sample was placed in a stainless steel container. A heating tape was wrapped on the container. The temperature of the container was controlled by a connected temperature controller and K-type thermocouple. The container consisted of a single inlet and outlet.
b. The container was heated to 473K with heating rate 1 (K/min).
c. Mixture of oxygen and ozone was directed to the container for certain time. The time was the activation time for the thinner region of the zeolite membrane. The ozone concentration was 106 (g/m$^3$) at flow rate of 157.2 (cm$^3$/min) at 3 psi.
d. After ozone treatment, the container was cooled down by disassembling the setup in room condition.
e. The sample was characterized using SEM.

Figures 22A, 22B:
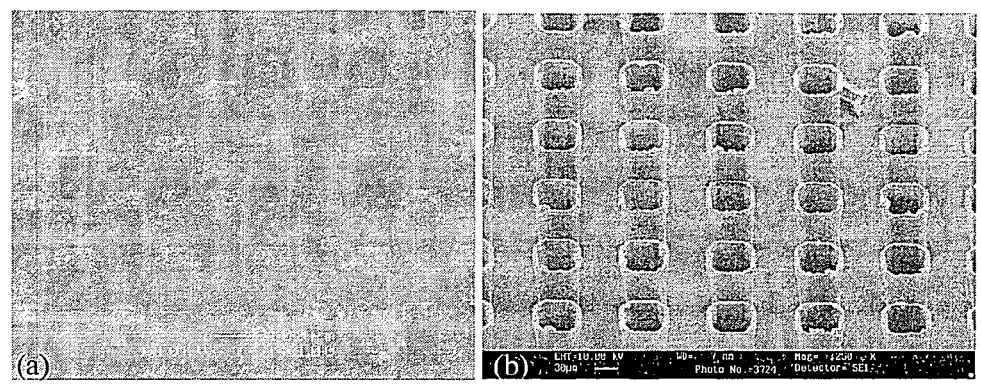

FIGS. 22(a) and 22(b) are the images showing a closed-tip microneedle and an open-tip microneedle, respectively. It is to be noted that the difference of the fabrication method between closed-tip and open tip microneedle is that the closed-tip microneedle requires longer zeolite synthesis time in the step Example 11(4). In particular, closed-tips typically requires 72 hours for synthesis while open-tips requires 24 hours.

Example 12

Liquid Phase Ozone Treatment for Fabrication of Zeolite Hollow Microsphere

In addition to gas phase process, the ozone treatment can be performed in liquid-phase. This is advantageous to prepare a highly dispersed zeolite particle suspension since the gas-phase treatment will cause aggregation of the activated zeolite particles.

Experimental Procedure
(1) Preparation of zeolite microsphere
a. 1 ml of Poly (dillyidimethlmmonium chloride) (PDAMAC, 1 mg/ml in 0.5M NaCl, Sigma) was added to a 100 μl suspension of 4.5 μm polystyrene particles (1 wt %, ~$10^{11}$ particles $mL^{-1}$, Polyscience).
b. The suspension was stirred at room temperature for 15 minutes to allow adsorption of the PDAMAC onto the polystyrene particles.
c. The suspension was centrifuged at 6,000 g (Sorvall RC-50) for 5 minutes,
d. Following the removal of supernatant, the coated particles were washed three times with 0.5 M sodium chloride solution to remove excess PDAMAC.
e. 1 ml aliquot of polystyrene sulfonate (PSS, 1 mg $ml^{-1}$ in 0.5 M NaCl, Aldrich) was added to the particles so that a second polyelectrolyte layer with negative charge was coated on the particle surface.
f. The suspension was stirred at room temperature for 15 minutes to allow adsorption of the PDAMAC onto the polystyrene particles.
g. The suspension was centrifuged at 6,000 g for 5 minutes.
h. Following the removal of supernatant, the coated particles were washed three times with 0.5 M sodium chloride solution to remove excess PSS.
i. 1 ml of Poly (dillyldimethlmmonium chloride) (PDAMAC, 1 mg/ml in 0.5M NaCl, Sigma) was added to the particles to coat the third layer of polyelectrolyte.
j. The suspension was stirred at room temperature for 15 minutes to allow adsorption of the PDAMAC onto the polystyrene particles.
k. The suspension was centrifuged at 6,000 g for 5 minutes.
l. After the removal of supernatant, the coated particles were suspended in 900 μl of Double Deionized (DDI) water.

(2) Zeolite growth on the polystyrene particles
a. 100 μl of zeolite seed (2 wt %) was added onto the polystyrene particle suspension.
b. The suspension was stirred at room temperature overnight.
c. Zeolite seed-coated PS particles were transferred into a Teflon container in which 20 ml zeolite synthesis solution (e.g Sil-1 and ZSM-5) prepared as described in Example 1b.
d. The Teflon container was assembled in an autoclave and placed in a preheated oven at 130° C. for 24 hours.
e. After that, the autoclave was quenched and the zeolite microspheres in the solution were separated from the solution by centrifugation (Sorvall RC-50); 3000 g for 5 minutes.
f. After discarding the supernatant, microspheres were washed with DDI water again and purified by centrifugation at 1000 g for 1 minute and then re-suspended in 1 ml DDI water.

(3) Liquid-phase ozone treatment for fabrication of zeolite hollow microsphere
a. The 1 ml zeolite microsphere suspension and 50 ml of DDI water were transferred in a glass container a single inlet and outlet, a glass gas bubbler which was immersed in the solution was connected to the inlet.
b. The glass container was wrapped by heating tape. The temperature of solution was controlled with aid of a temperature controller and thermocouple.
c. The solution was heated to 353K with heating rate at 2 (K/min).
d. When the temperature reached 353K, a mixture of oxygen and ozone with ozone concentration 100 (g/$m^3$) was flowed to the solution through the bubblers. The gas mixture after passing through the solution was collected to the outlet which directed to a ozone destructor.
e. The ozone treatment lasted for 20 hours.
f. After the treatment, the solution was cooled down by detaching the heating tape. The solution was kept open in the fumehood overnight to allow the remaining ozone molecules to be decomposed.

Figure 23A:
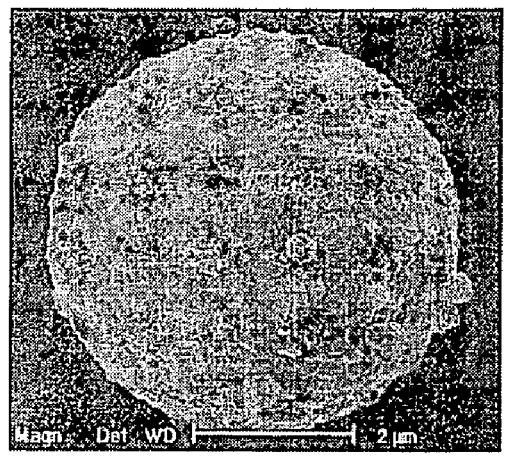
FIGS. 23(a) and (b) relate to Example 12 and show a hollow zeolite microsphere, in that (a) shows a SEM image of the outer surface of the sphere and (b) shows a TEM image showing an empty interior of the microsphere.
Figure 23B:
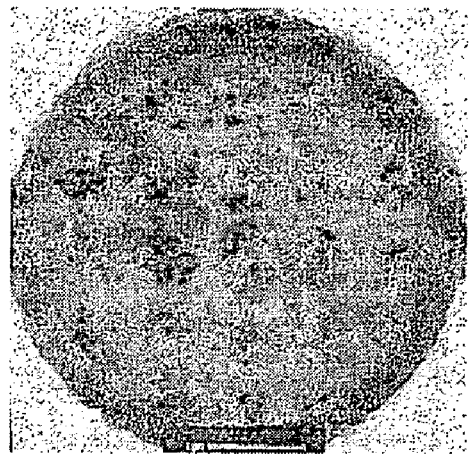

FIGS. 23 (a) and (b) show a hollow zeolite microsphere from the example. In particular, in (a) it is a SEM image showing the outer surface of the sphere while in (b) it is a TEM image showing the empty interior of the sphere.

Figure 24:
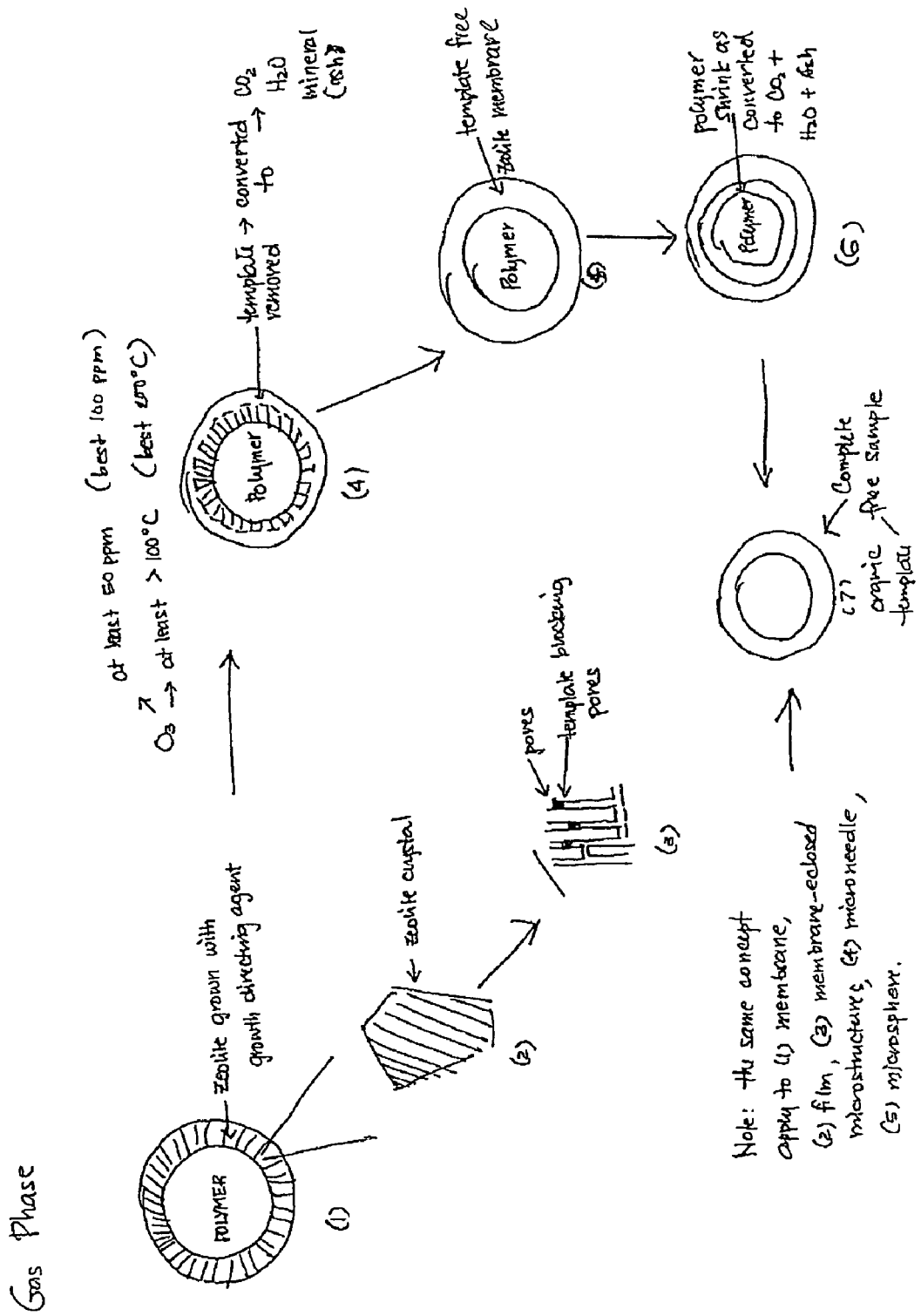
FIG. 24 is a flow chart illustrating the formation of different zeolite microstructures.
Figure 25:
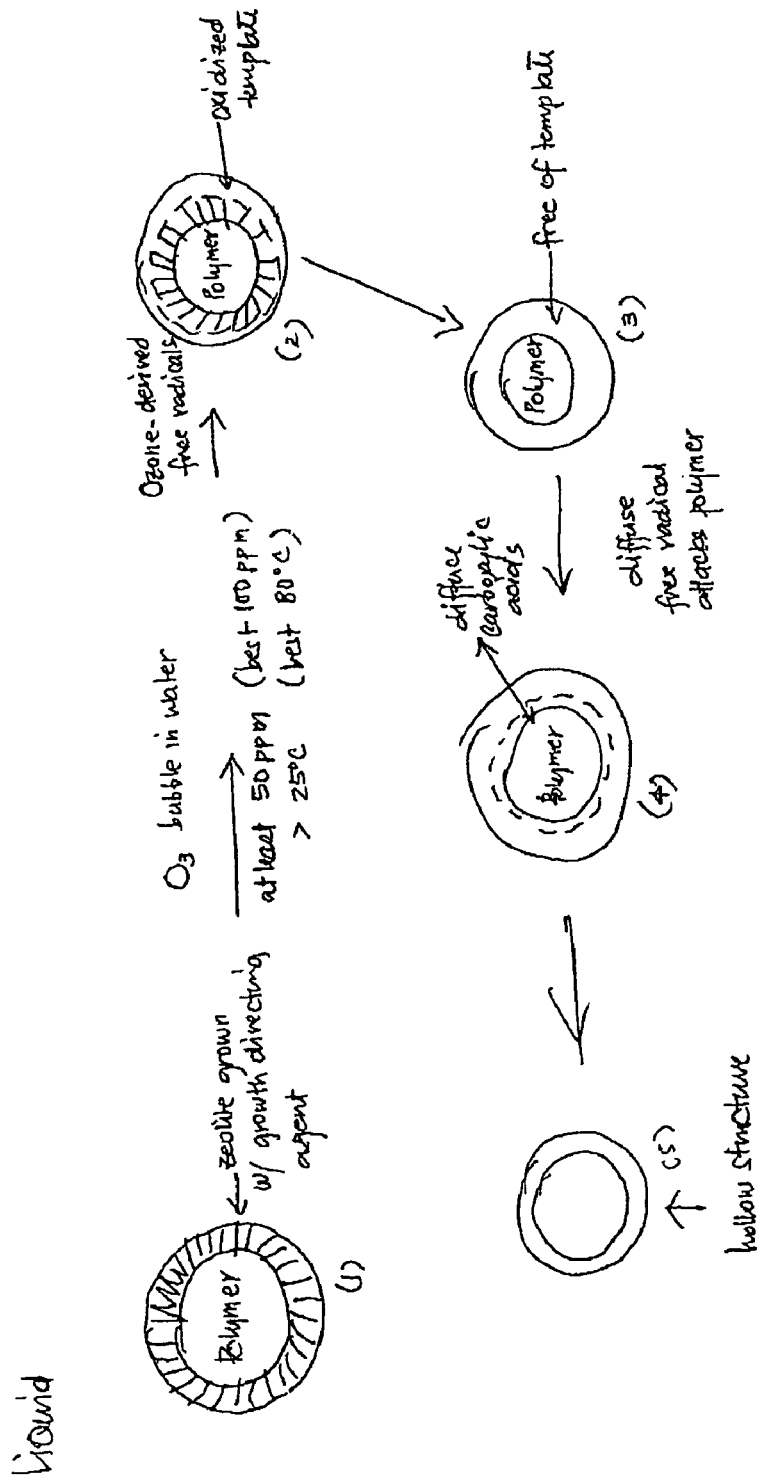
FIG. 25 is a flow chart illustrating the formation of a zeolite microsphere.

It is to be noted that the above described methods of zeolite structure formation allow fabrication of a variety of zeolite structures including zeolite membranes, zeolite films, membrane-enclosed microstructures, zeolite microneedles, and zeolite microspheres. FIG. 24 is a flow chart schematically illustrating the formation of these various types of zeolite structures in which a method of activating a zeolite membrane or structure by ozone in a gaseous mixture may be used. For example, the formation of a complete free sample of zeolite microsphere having a hollow interior (7) is shown after having gone through the steps at (1) to (6). A zeolite crystal or film (2) is obtainable after having gone through the step at (1). A membrane-enclosed zeolite microstructure is obtainable after having gone through the steps at (1) to (2). FIG. 25 is another flow chart schematically illustrating the formation of a zeolite microsphere (5) after having gone through the steps at (1) to (4). In the formation of the zeolite structure (5), the structure (1) is subject to ozone activation in a liquid mixture environment.

It will thus be seen that at least in its preferred forms the present invention provides a novel method for the activation of zeolite using a relatively low temperature ozone treatment. The method is advantageous in that in comparison with prior art high temperature calculation techniques the lower temperature used in the method reduces the likelihood of crack formation in the resulting zeolite. Furthermore when used to form a zeolite membrane, the method of preferred forms of the invention is at least as good as the prior art in terms of gas permeance and selectivity.

Although the examples are all of single uniform zeolite membranes simply grown on a substrate, this is for the convenience of illustration only and it will be understood that the activation techniques of the present invention could be used in combination with the zeolite patterning and microchannel and microtunnel formation techniques illustrated in the prior art identified in the introduction to the present specification and elsewhere.

The invention claimed is:
1. A method of activating a zeolite membrane and removing a template or a growth directing agent from the membrane, comprising a step of passing ozone through a liquid mixture and forming an ozone-containing liquid mixture and placing the membrane in contact with the ozone-containing liquid mixture, wherein said liquid mixture has a temperature in the range from 298K to about 353K, the ozone concentration passing through said liquid mixture is about 100 ppm, and the membrane is treated with said liquid mixture for at least one hour.
2. A method as claimed in claim 1 wherein said liquid mixture is a mixture of oxygen and ozone.
3. A method as claimed in claim 1 wherein the membrane is treated with said fluid mixture for about 20 hours.
4. A method as claimed in claim 1, wherein the template to be removed from said membrane is partially gasified.
5. A method as claimed in claim 1, further comprising a step of free-radically oxidizing the template trapped by the membrane into soluble organic fragments and a further step of diffusing to and dissolving into the liquid mixture.

6. A method of forming a zeolite membrane comprising the steps of (a) growing a zeolite membrane on a substrate, and (b) activating the membrane by an activation method as claimed in claim 1.

7. A method of removing a polymer member enclosed by a zeolite membrane or film at at least one side of the polymer member, comprising contacting the member with a liquid mixture containing ozone, wherein said liquid mixture has a temperature of at least 298K.

8. A method as claimed in claim 7 wherein the polymer member is enclosed by the zeolite membrane and is spherical in shape.

9. A method as claimed in claim 7 wherein the polymer member is enclosed by the zeolite member and is in the form of a microneedle.

10. A method as claimed in claim 7 wherein said liquid mixture is a mixture of oxygen and ozone.

11. A method as claimed in claim 7 wherein the ozone concentration passing through said liquid mixture is at least 50 $g/m^3$.

12. A method of removing a polymer member enclosed by a zeolite membrane or film at at least one side of the polymer member, comprising contacting the member with a gaseous mixture containing ozone, wherein said gaseous mixture has a temperature of at least 373K.

13. A method as claimed in claim 12 wherein the polymer member is enclosed by the zeolite membrane and is spherical in shape.

14. A method as claimed in claim 12 wherein the polymer member is enclosed by the zeolite member and is in the form of a microneedle.

15. A method as claimed in claim 12 wherein said gaseous mixture is a mixture of oxygen and ozone.

16. A method as claimed in claim 12 wherein the ozone concentration is at least 50 $g/m^3$.

17. A method of preparing a zeolite membrane enclosed microstructure, comprising the step of passing ozone through a liquid mixture and forming an ozone-containing liquid mixture and placing the membrane in contact with the ozone-containing liquid mixture, wherein said liquid mixture has a temperature in the range from 298K to about 353K, the ozone concentration passing through said liquid mixture is about 100 ppm, and the membrane is treated with said liquid mixture for at least one hour, for activating the zeolite membrane and removing a template or a growth directing agent from the membrane.

18. A method of activating a zeolite membrane and removing a template or a growth directing agent from the membrane, comprising a step of passing ozone through a liquid mixture and forming an ozone-containing liquid mixture and placing the membrane in contact with the ozone-containing liquid mixture, wherein said liquid mixture has a temperature in the range from 298K to about 353K, the ozone concentration passing through said liquid mixture is about 100 ppm, and the membrane is treated with said liquid mixture for at least one hour.

* * * * *